United States Patent
Park et al.

(10) Patent No.: US 10,514,438 B2
(45) Date of Patent: Dec. 24, 2019

(54) METHOD FOR PERFORMING POSITIONING IN WIRELESS COMMUNICATION SYSTEM AND DEVICE THEREFOR

(71) Applicant: LG ELECTRONICS INC., Seoul (KR)

(72) Inventors: Jonghyun Park, Seoul (KR); Yunjung Yi, Seoul (KR); Hyangsun You, Seoul (KR); Kijun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/508,747

(22) PCT Filed: Sep. 3, 2015

(86) PCT No.: PCT/KR2015/009280
§ 371 (c)(1),
(2) Date: Mar. 3, 2017

(87) PCT Pub. No.: WO2016/036154
PCT Pub. Date: Mar. 10, 2016

(65) Prior Publication Data
US 2017/0276761 A1    Sep. 28, 2017

Related U.S. Application Data

(60) Provisional application No. 62/045,564, filed on Sep. 4, 2014.

(51) Int. Cl.
*H04W 4/02*        (2018.01)
*G01S 5/02*        (2010.01)
(Continued)

(52) U.S. Cl.
CPC .............. *G01S 5/0257* (2013.01); *G01S 5/02* (2013.01); *G01S 5/0236* (2013.01);
(Continued)

(58) Field of Classification Search
CPC ....... H04W 64/00; H04W 24/10; H04W 4/02; H04W 4/025; H04W 64/003; G01S 5/10; G01S 5/0257; G01S 5/0273; G01S 5/0263
See application file for complete search history.

(56) References Cited

U.S. PATENT DOCUMENTS 9,967,912 B2 *    5/2018    Kazmi .................. H04W 8/005
2012/0033615 A1    2/2012    Dai et al.
(Continued)

FOREIGN PATENT DOCUMENTS

WO    WO 2012/008816 A2    1/2012

OTHER PUBLICATIONS

Huawei, "Small cell enhancements-physical layer aspects", RP-141243, 3GPP TSG RAN meeting #65, Edinburgh, Scotland, Sep. 9-12, 2014, pp. 1-21, See pp. 1-12.
(Continued)

*Primary Examiner* — Khawar Iqbal
(74) *Attorney, Agent, or Firm* — Birch, Stewart, Kolasch & Birch, LLP

(57) ABSTRACT

Disclosed is a method for performing positioning by a user equipment (UE) in a wireless communication system including: receiving first assistance data including first reference cell information and first neighbor cell information from a first base station (BS) through a first frequency; receiving second assistance data including second reference cell information and second neighbor cell information from a second base station through a second frequency; receiving a positioning reference signal (PRS) on the basis of the first
(Continued)

assistance data and receiving a discovery reference signal (DRS) on the basis of the second assistance data; performing measurement using the received PRS and the DRS; and reporting a measurement result to a serving BS.

12 Claims, 16 Drawing Sheets

(51) Int. Cl.
  *H04W 64/00* (2009.01)
  *H04W 24/10* (2009.01)
  *G01S 5/10* (2006.01)

(52) U.S. Cl.
  CPC .......... *G01S 5/0242* (2013.01); *G01S 5/0273* (2013.01); *H04W 4/025* (2013.01); *H04W 64/00* (2013.01); *G01S 5/0263* (2013.01); *G01S 5/10* (2013.01); *H04W 24/10* (2013.01); *H04W 64/003* (2013.01)

(56) References Cited

U.S. PATENT DOCUMENTS

| | | | |
|---|---|---|---|
| 2013/0122930 A1 | 5/2013 | Woo et al. | |
| 2013/0294391 A1 | 11/2013 | Guo et al. | |
| 2015/0092582 A1* | 4/2015 | Liao | H04J 11/005 370/252 |
| 2015/0270936 A1* | 9/2015 | Han | H04L 5/0048 370/329 |
| 2016/0205499 A1* | 7/2016 | Davydov | H04W 4/02 455/456.1 |
| 2016/0337798 A1* | 11/2016 | Fischer | H04W 4/023 |
| 2017/0111880 A1* | 4/2017 | Park | H04W 64/00 |
| 2017/0150427 A1* | 5/2017 | Cheng | H04W 48/16 |
| 2017/0164419 A1* | 6/2017 | Kim | H04L 5/00 |
| 2017/0230852 A1* | 8/2017 | You | H04L 1/0693 |
| 2017/0245205 A1* | 8/2017 | You | H04L 1/0693 |
| 2017/0289831 A1* | 10/2017 | Park | G01S 5/02 |
| 2017/0374517 A1* | 12/2017 | Davydov | H04W 4/023 |
| 2018/0103386 A1* | 4/2018 | Harada | H04W 16/14 |
| 2018/0124618 A1* | 5/2018 | You | H04W 48/12 |
| 2018/0279403 A1* | 9/2018 | Kim | H04L 5/00 |
| 2018/0323885 A1* | 11/2018 | Horiuchi | H04L 5/005 |
| 2019/0007897 A1* | 1/2019 | Ng | H04W 48/16 |
| 2019/0007933 A1* | 1/2019 | Yi | H04J 11/0069 |
| 2019/0141632 A1* | 5/2019 | Larsson | H04W 52/0229 |

OTHER PUBLICATIONS

Panasonic, "Views on evaluation methodology for LTE D2D proximity services", R1-130325, 3GPP TSG-RAN WG1 Meeting #72, St Julian's, Malta, Jan. 28-Feb. 1, 2013, pp. 1-4.

* cited by examiner

【Figure 1】
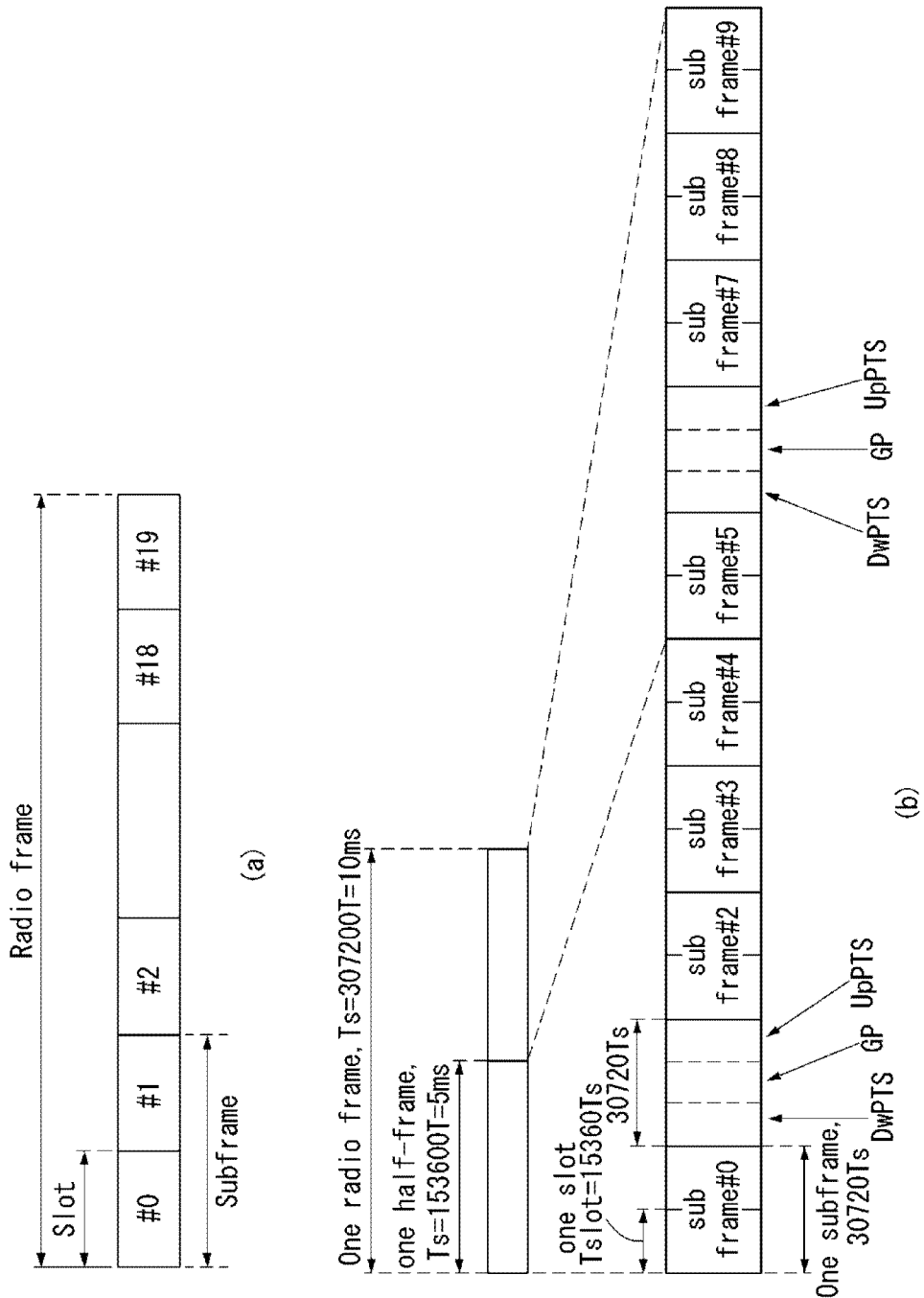

[Figure 2]
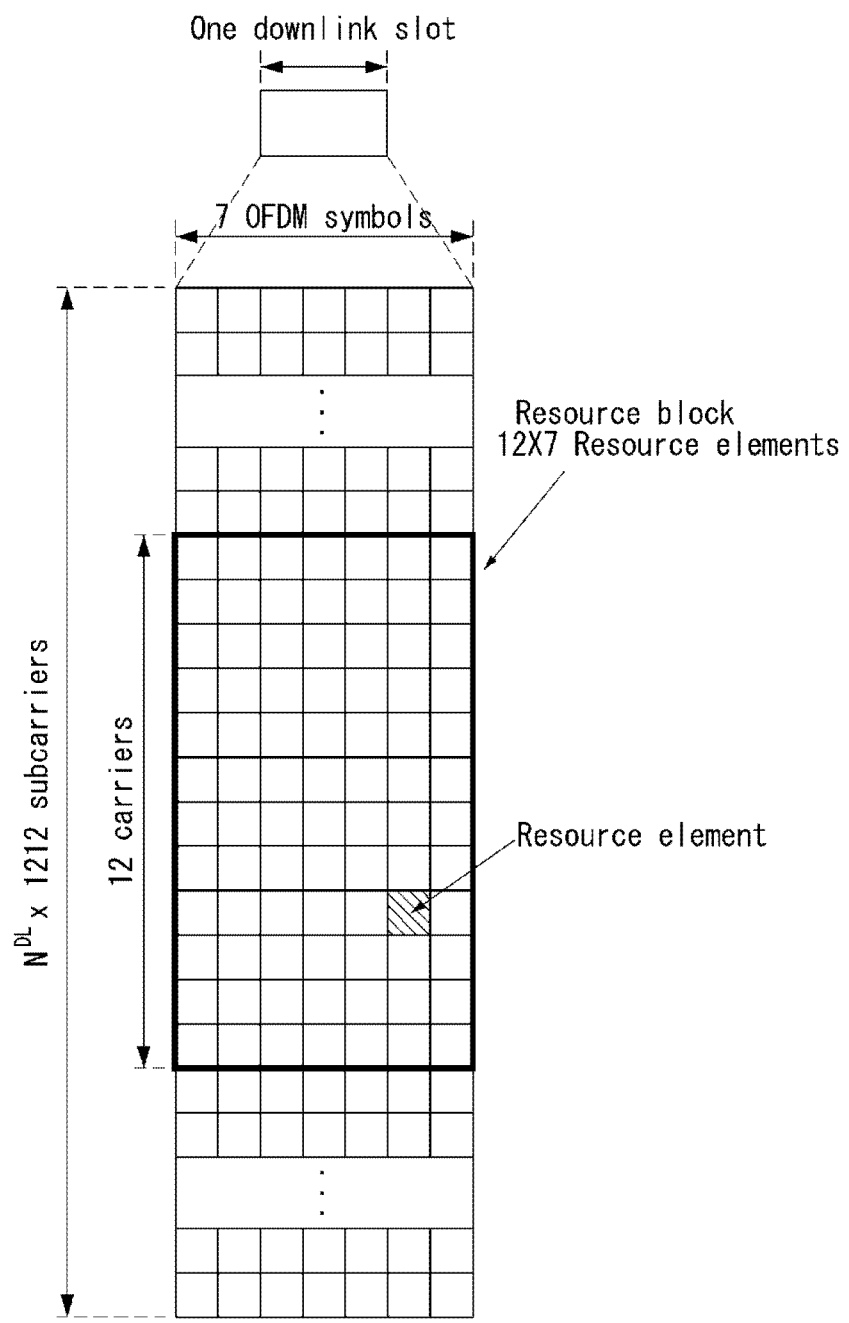

[Figure 3]
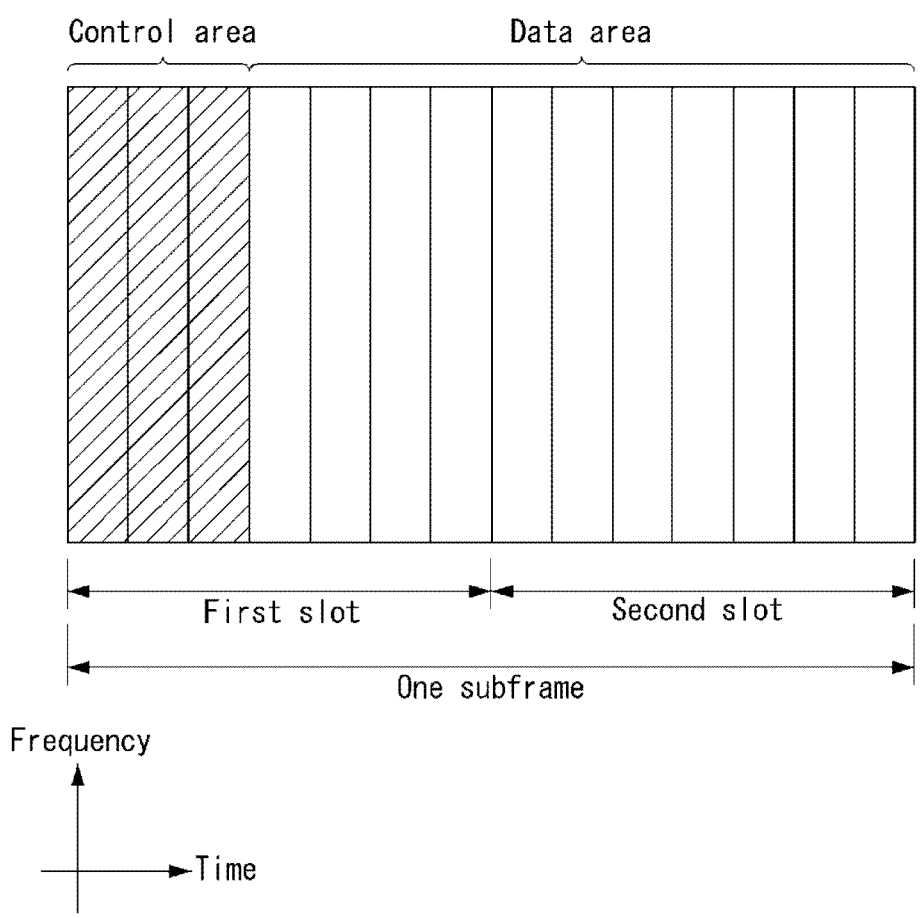

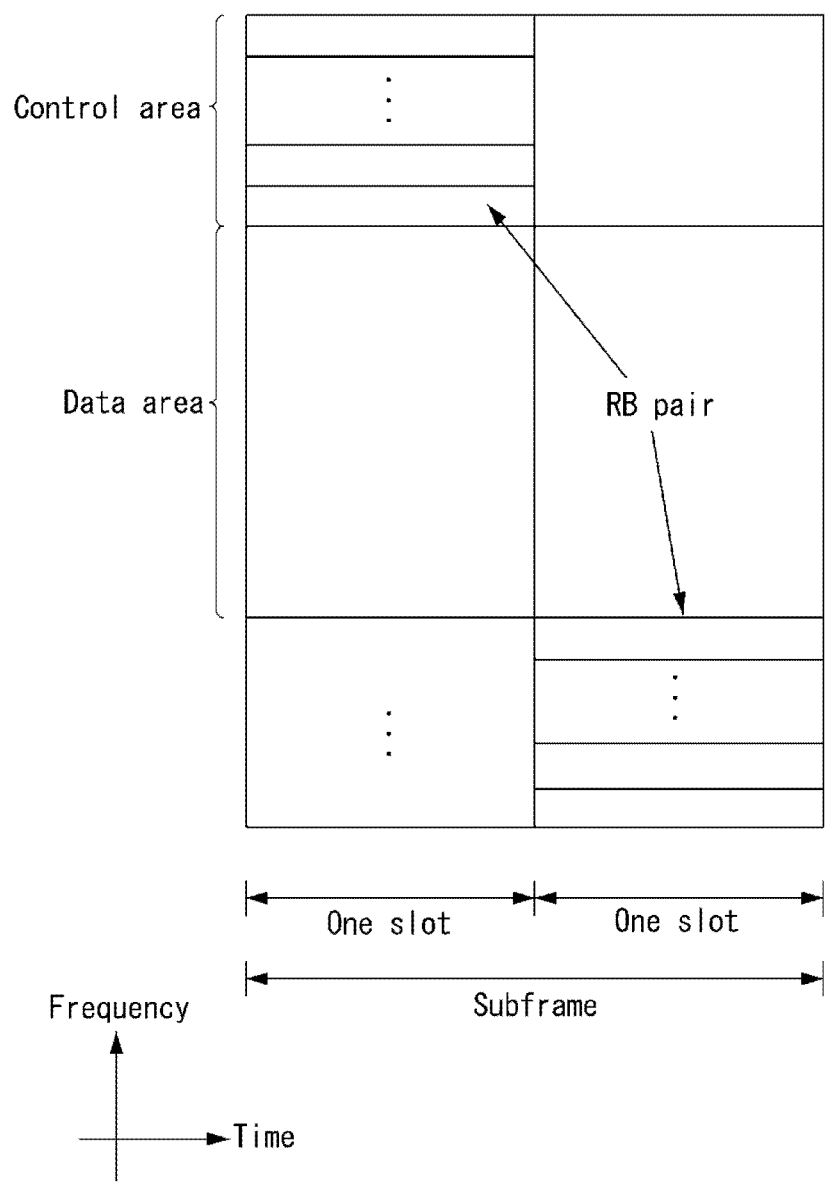
[Figure 4]

【Figure 5】
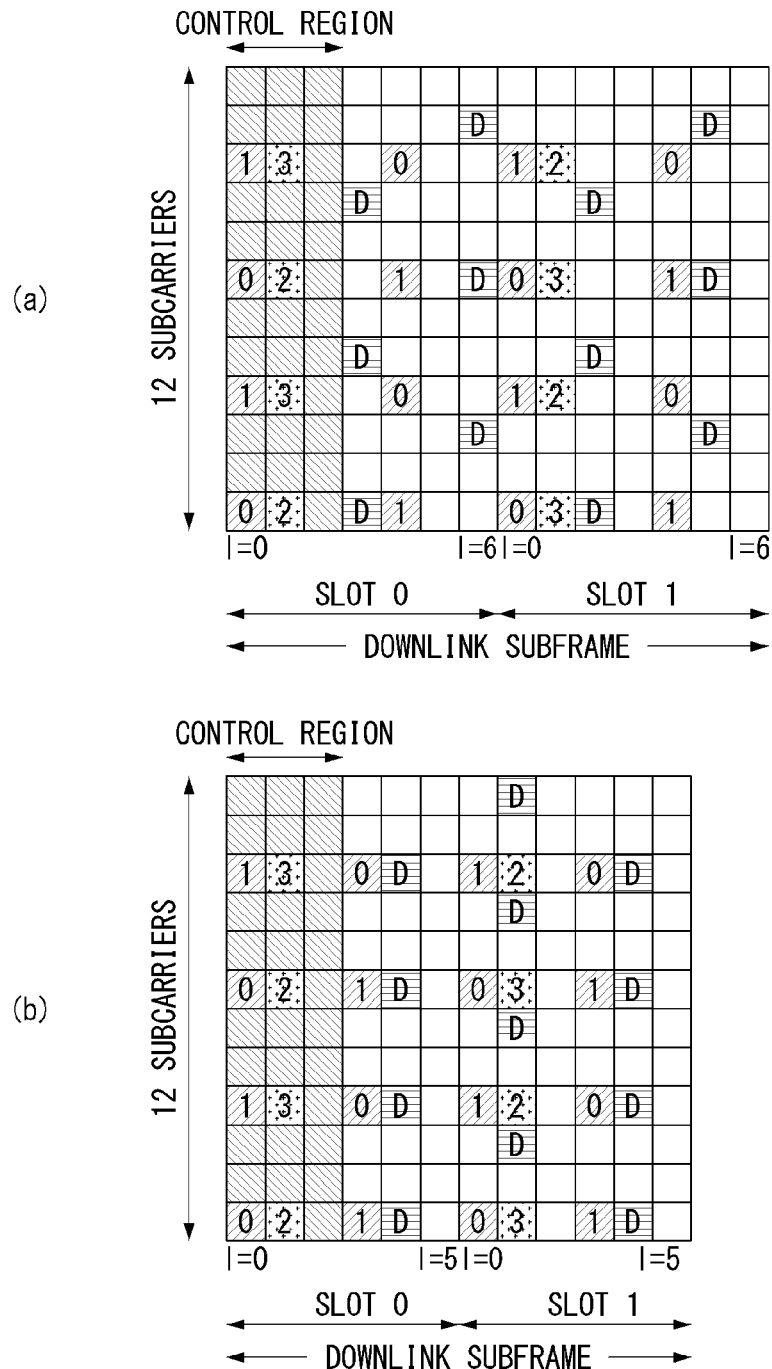

[Figure 6]
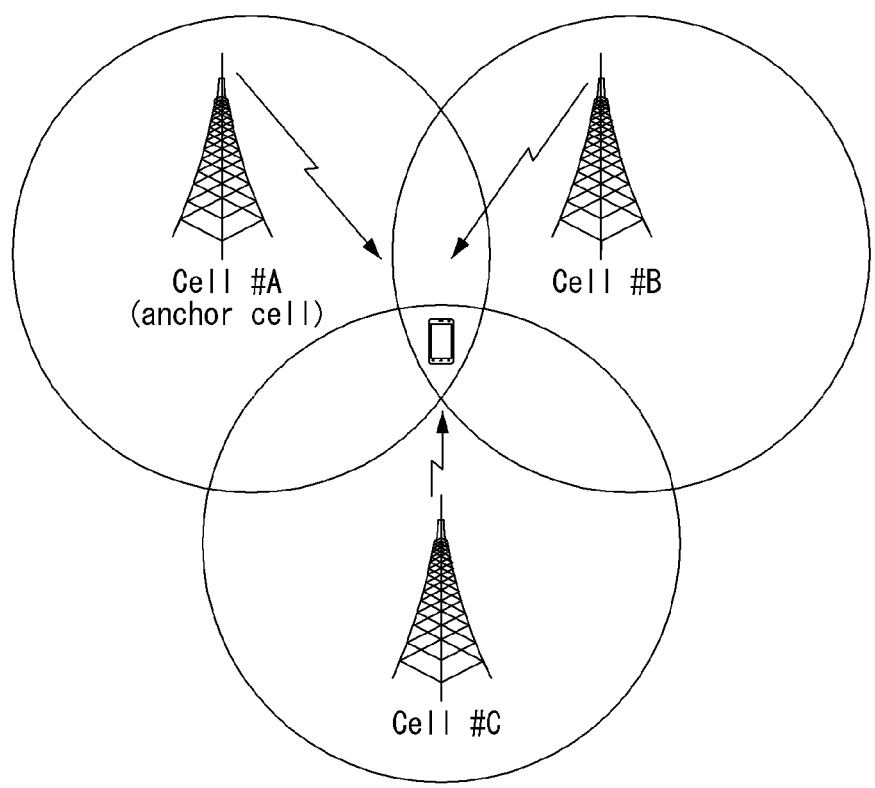

【Figure 7】
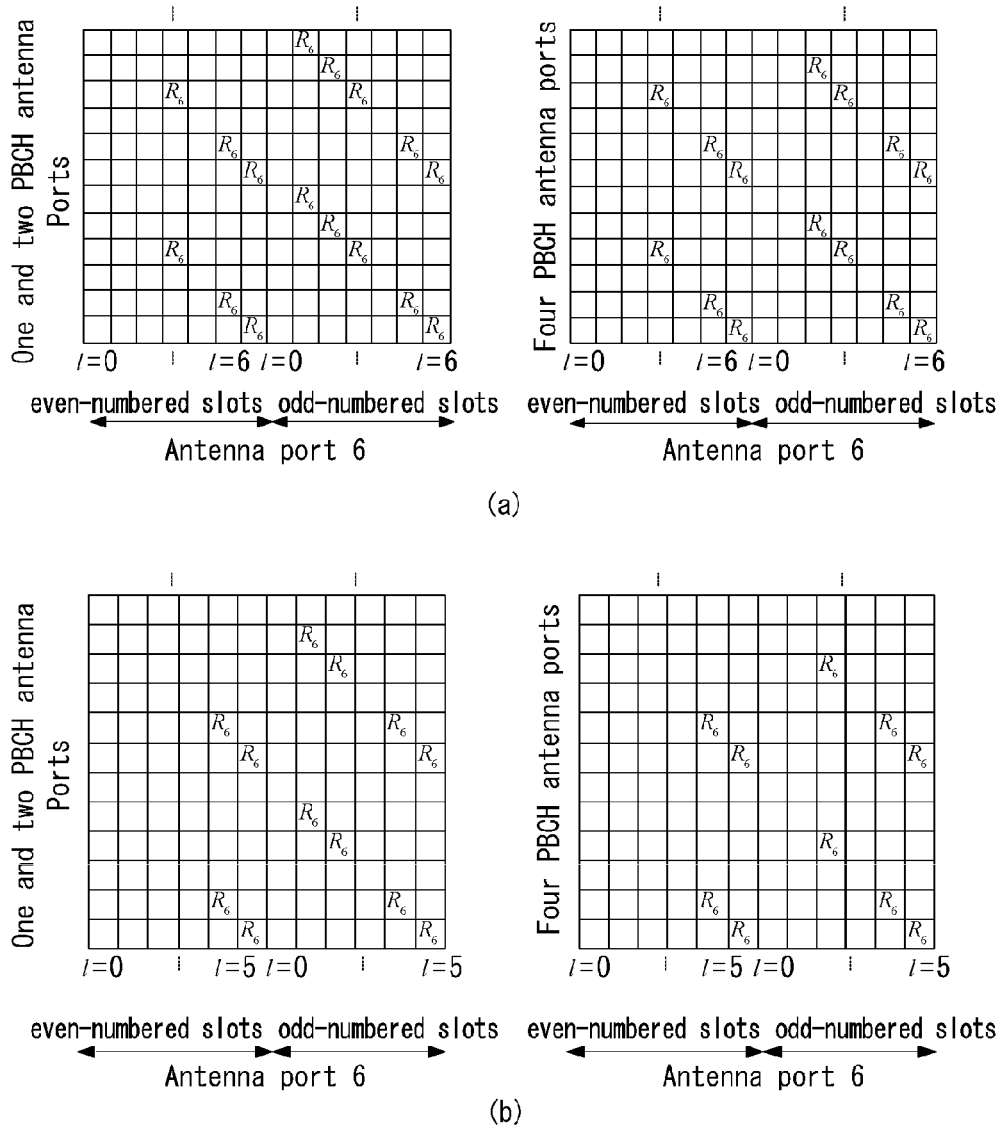

【Figure 8】
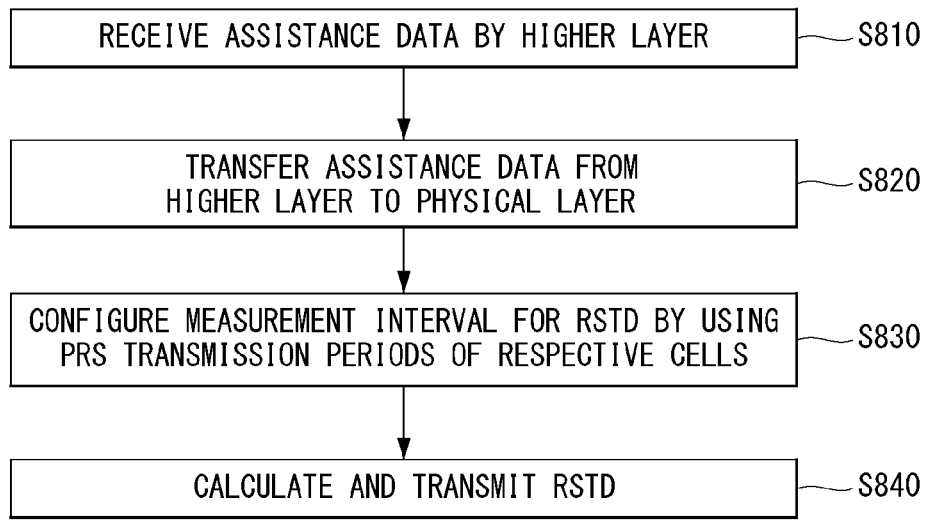
【Figure 9】
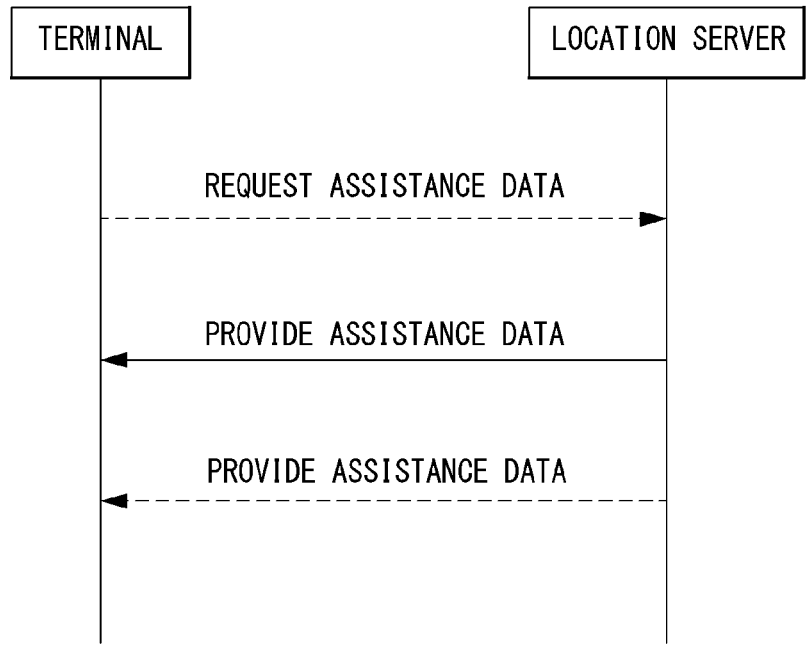

[Figure 10]
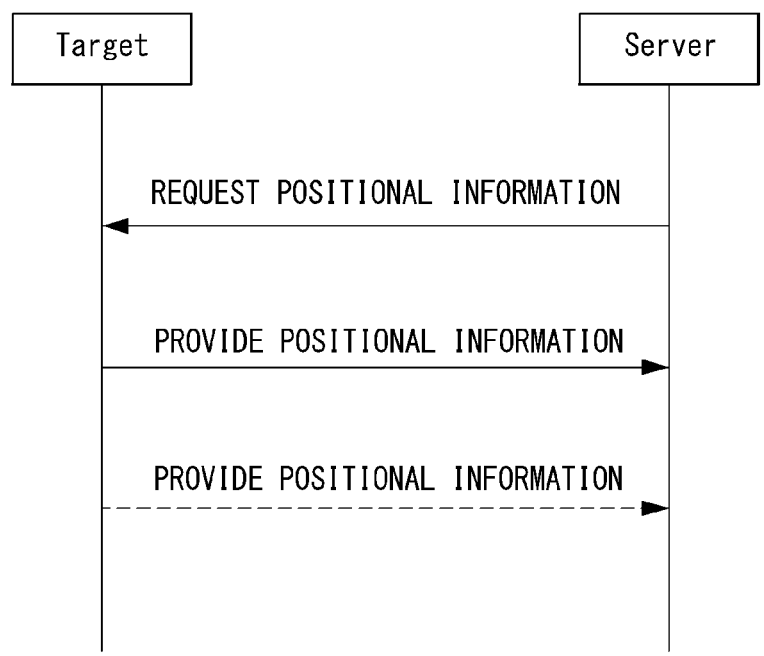

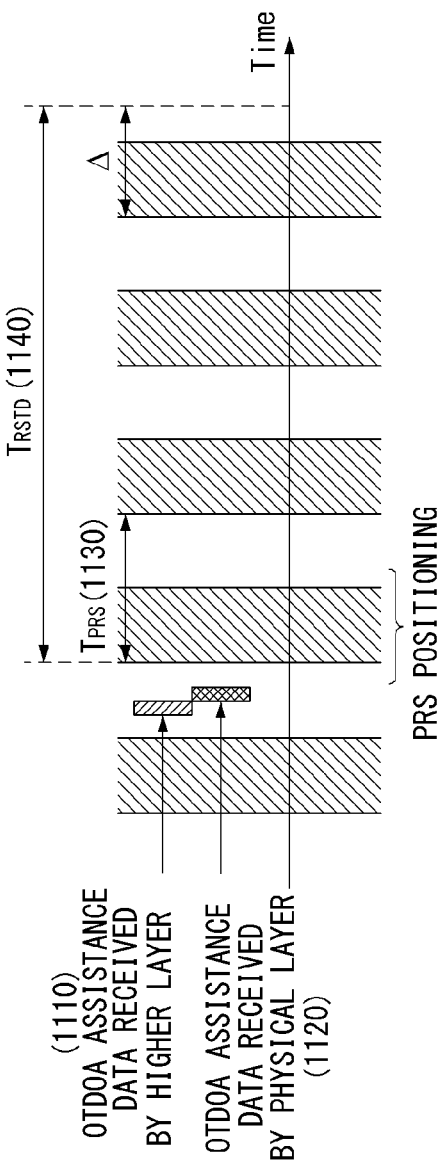
[Figure 11]

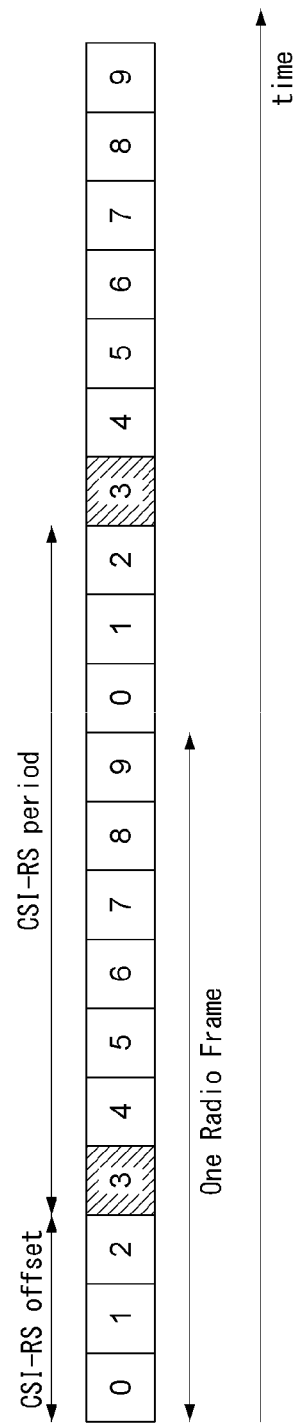
[Figure 12]

[Figure 13]
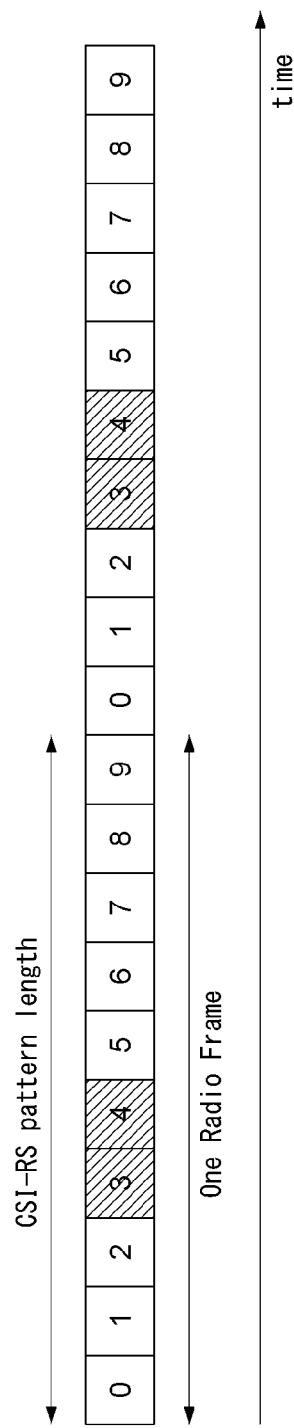

【Figure 14】
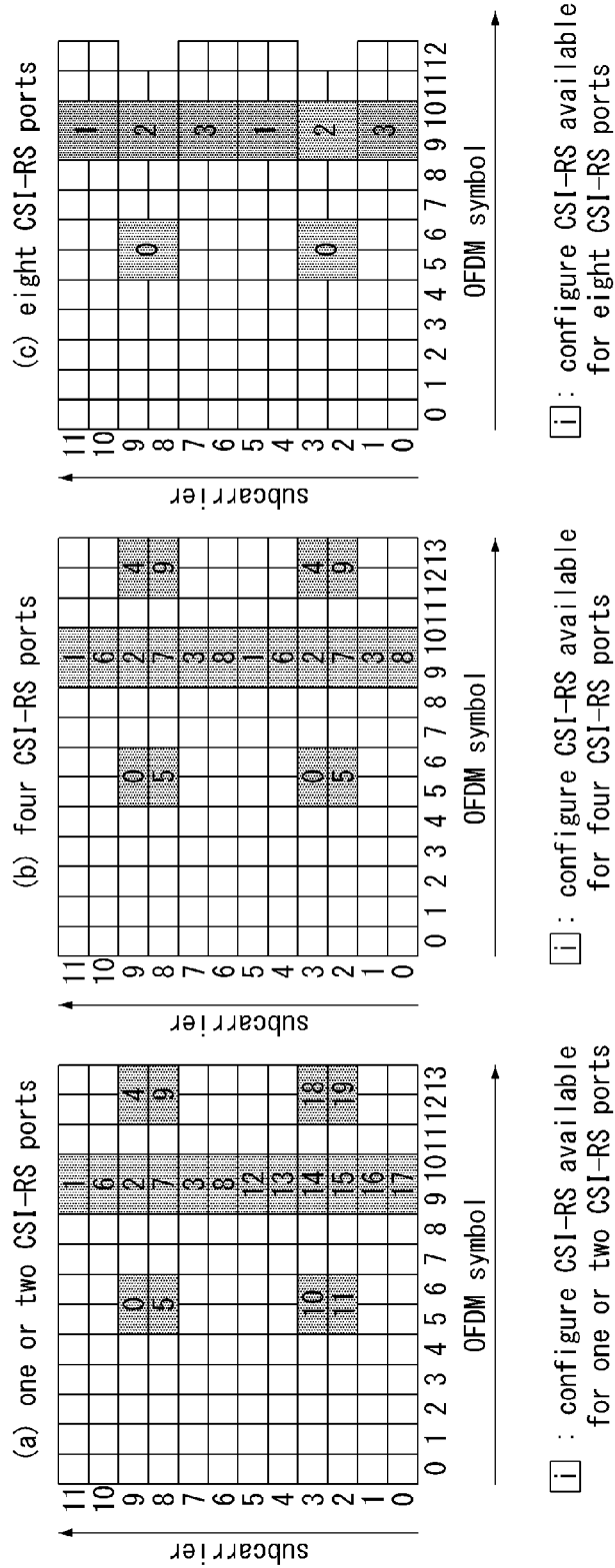

【Figure 15】
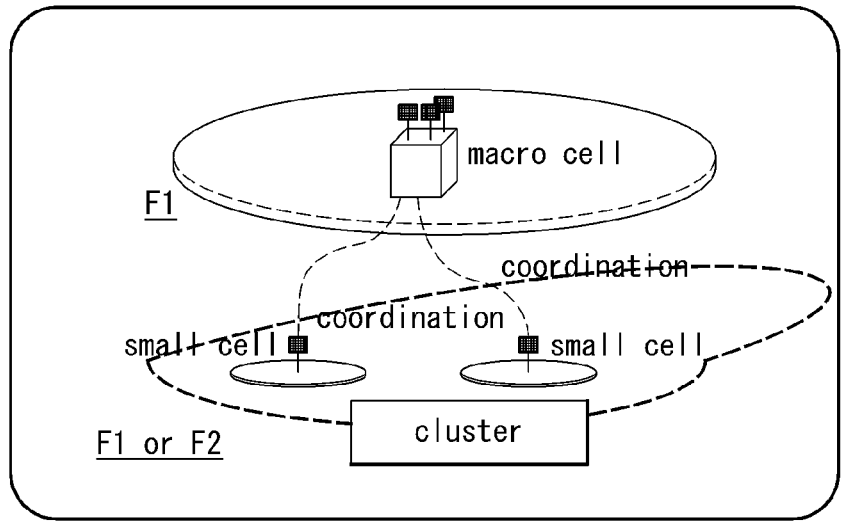
【Figure 16】
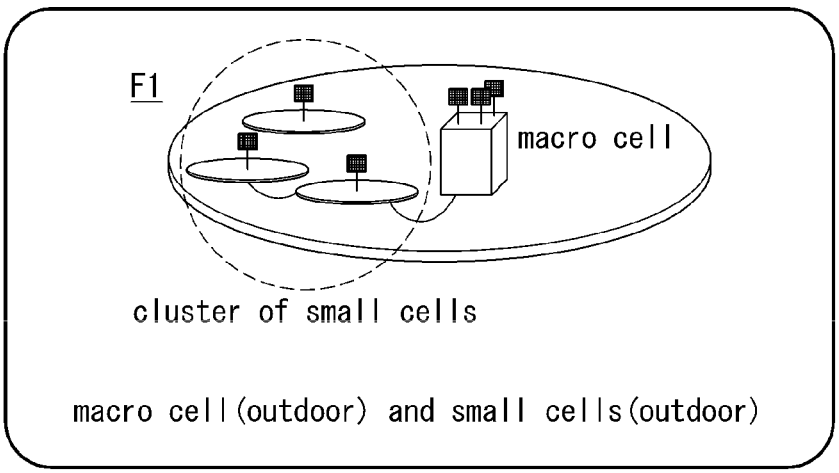
——— backhaul link in cluster
——— backhaul link between small cells and macro cell
users (UEs) are disposed in both outdoor and indoor areas.

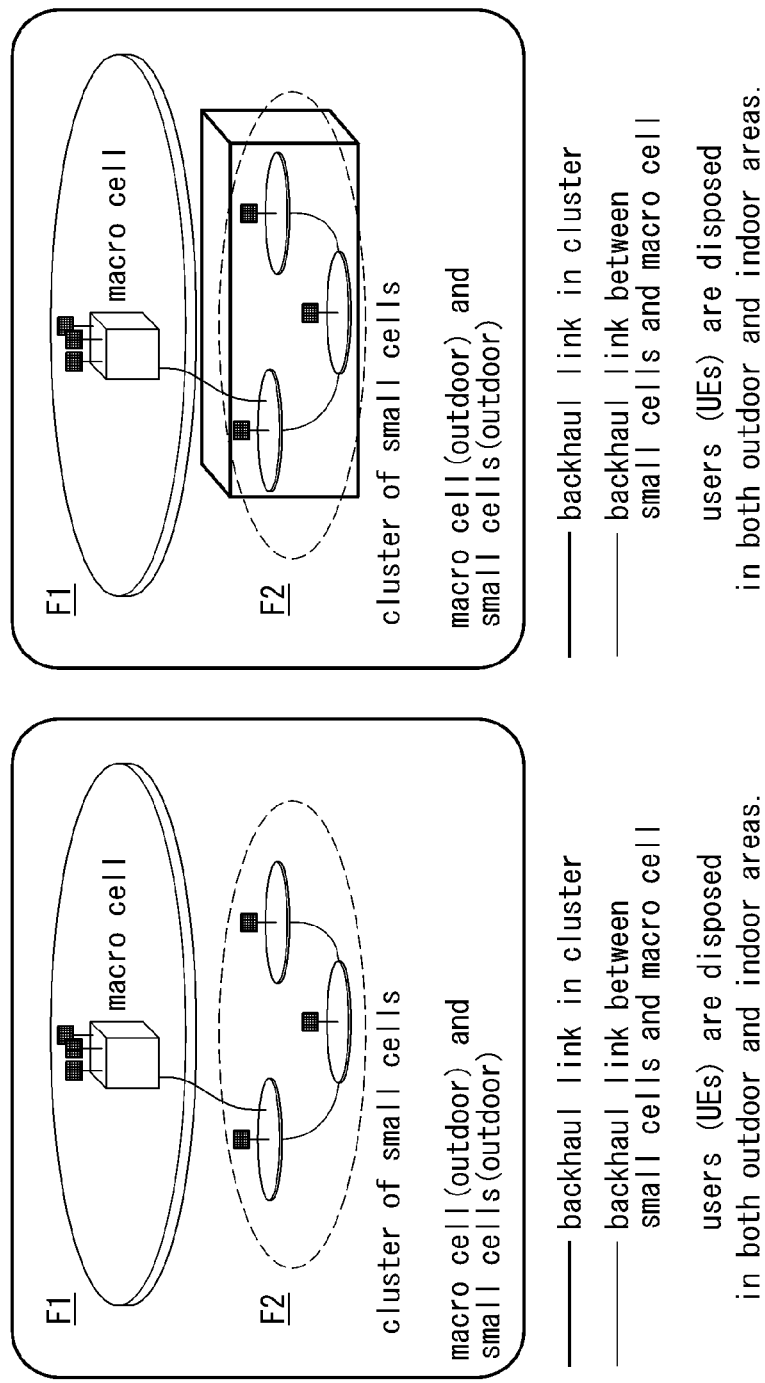

[Figure 18]
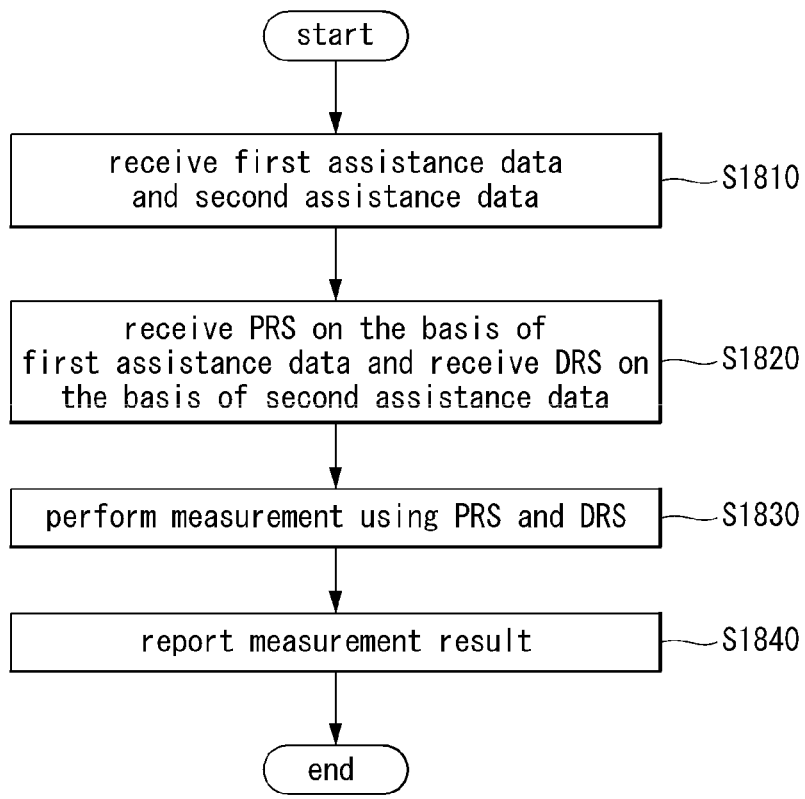
[Figure 19]
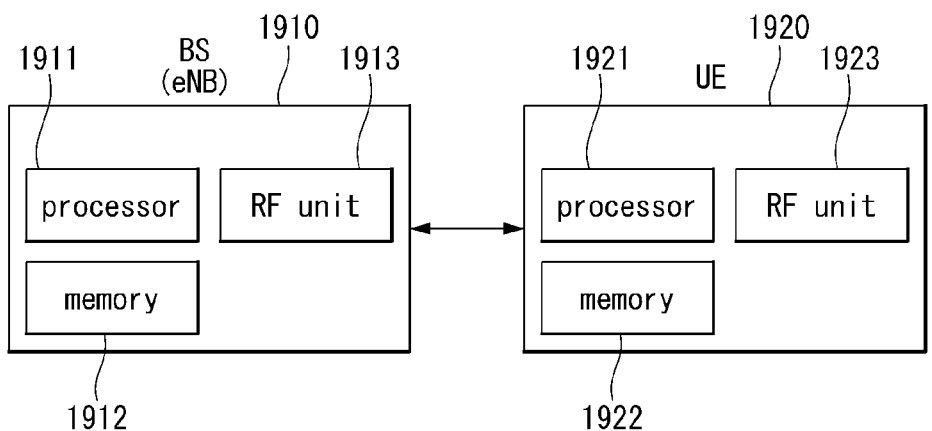

METHOD FOR PERFORMING POSITIONING IN WIRELESS COMMUNICATION SYSTEM AND DEVICE THEREFOR

CROSS REFERENCE TO RELATED APPLICATIONS

This application is the National Phase of PCT International Application No. PCT/KR2015/009280, filed on Sep. 3, 2015, which claims priority under 35 U.S.C. 119(e) to U.S. Provisional Application No. 62/045,564, filed on Sep. 4, 2014, all of which are hereby expressly incorporated by reference into the present application.

TECHNICAL FIELD

The present invention relates to a wireless communication system and, more particularly, to a method for performing positioning in a wireless communication system and a device supporting the same.

BACKGROUND ART

Mobile communication systems have been developed to provide voice services while ensuring the activity of a user. However, the mobile communication systems have been expanded to their regions up to data services as well as voice. Today, the shortage of resources is caused due to an explosive increase of traffic, and more advanced mobile communication systems are required due to user's need for higher speed services.

Requirements for a next-generation mobile communication system basically include the acceptance of explosive data traffic, a significant increase of a transfer rate per user, the acceptance of the number of significantly increased connection devices, very low end-to-end latency, and high energy efficiency. To this end, research is carried out on various technologies, such as dual connectivity, massive Multiple Input Multiple Output (MIMO), in-band full duplex, Non-Orthogonal Multiple Access (NOMA), the support of a super wideband, and device networking.

DISCLOSURE

Technical Problem

An aspect of the present invention provides a method for performing measurement of a terminal related to positioning using a positioning reference signal (PRS) and a discovery reference signal (DRS).

Another aspect of the present disclosure provides a blind detection method of a terminal for performing DRS-based positioning and defines information required therefor.

Another aspect of the present disclosure provides a method for indicating that a DRS is used for the purpose of positioning.

Technical tasks obtainable from the present invention are non-limited by the above-mentioned technical task. And, other unmentioned technical tasks can be clearly understood from the following description by those having ordinary skill in the technical field to which the present invention pertains.

Technical Solution

According to an aspect of the present invention, there is provided a method for performing positioning by a user equipment (UE) in a wireless communication system, including: receiving first assistance data including first reference cell information and first neighbor cell information from a first base station (BS) through a first frequency; receiving second assistance data including second reference cell information and second neighbor cell information from a second base station through a second frequency; receiving a positioning reference signal (PRS) on the basis of the first assistance data and receiving a discovery reference signal (DRS) on the basis of the second assistance data; performing measurement using the received PRS and the DRS; and reporting a measurement result to a serving BS.

Also, in this disclosure, the second frequency may be higher than the first frequency, and a transmission period of the DRS may be shorter than a transmission period of the PRS.

Also, in this disclosure, the method may further include: receiving indication information indicating that the DRS is used for positioning through radio resource control (RRC) signaling.

Also, in this disclosure, the receiving of a PRS may include: receiving a PRS from each of a first reference cell and at least one first neighbor cell on the basis of the first assistance data, and the receiving of a DRS may include: receiving a DRS from each of a second reference cell and at least one second neighbor cell on the basis of the second assistance data.

Also, in this disclosure, the performing of measurement may include: measuring a first reference signal time difference (RSTD) regarding the first reference cell of the at least one first neighbor cell using the received PRS; and measuring a second RSTD regarding the second reference cell of the at least one second neighbor cell using the received DRS.

Also, in this disclosure, in the performing of measurement, an average power level regarding the received PRS and DRS may be measured.

Also, in this disclosure, the first assistance data may further include PRS information related to a cell transmitting a PRS, and the PRS information may include at least one of a physical cell ID (PCID) of a cell transmitting the PRS, a scrambling ID, a PRS transmission period, and a PRS transmission resource.

Also, in this disclosure, the second assistance data may further include positioning DRS information related to a DRS for positioning, and the positioning DRS information may include at least one of DRS measurement timing configuration (DMTC) information, DMTC occasion information, DRS information, identification information of the second reference cell, and identification information of the at least one second neighbor cell.

Also, in this disclosure, the DRS information may include at least one of a physical cell ID (PCID) of the at least one second neighbor cell, a cell global ID associated with the PCID, a DRS-channel state information (CSI)-RS configuration information, and zero power (ZP)-CSI-RS configuration information.

Also, in this disclosure, in the receiving of a DRS, the DRS may be blind-detected in a DMTC duration or a DMTC occasion duration on the basis of the positioning DRS information.

Also, in this disclosure, the first BS may be a macro BS or a macro cell, and the second BS may be a small BS or a small cell.

According to another aspect of the present invention, there is provided a user equipment (UE) for performing positioning in a wireless communication system, including: a radio frequency (RF) unit transmitting and receiving a wireless signal; and a processor functionally connected to the RF unit and controlling the UE, wherein the processor performs control to receive first assistance data including first reference cell information and first neighbor cell information from a first base station (BS) through a first frequency, receive second assistance data including second reference cell information and second neighbor cell information from a second base station through a second frequency, receive a positioning reference signal (PRS) on the basis of the first assistance data, receive a discovery reference signal (DRS) on the basis of the second assistance data, perform measurement using the received PRS and the DRS, and report a measurement result to a serving BS.

Advantageous Effects

According to embodiments of the present invention, since positioning is performed using a discovery reference signal (DRS), as well as a positioning reference signal (PRS), a location of a terminal may be more finely and effectively estimated in a congested area, an in-building environment, and the like.

Advantages and effects of the present invention that may be obtained in the present invention are not limited to the foregoing effects and any other technical effects not mentioned herein may be easily understood by a person skilled in the art from the present disclosure and accompanying drawings.

DESCRIPTION OF DRAWINGS

The accompanying drawings, which are included to provide a further understanding of the invention, illustrate embodiments of the invention and together with the description serve to explain the principle of the invention.

FIG. 1 is a view illustrating a structure of a radio frame in a wireless communication system to which the present disclosure is applicable.

FIG. 2 is a view illustrating a resource grid regarding one downlink slot in a wireless communication system to which the present disclosure is applicable.

FIG. 3 is a view illustrating a structure of a downlink subframe in a wireless communication system to which the present disclosure is applicable.

FIG. 4 is a view illustrating a structure of an uplink subframe in a wireless communication system to which the present disclosure is applicable.

FIG. 5 is a view illustrating a reference signal pattern mapped to a downlink resource block pair in a wireless communication system to which the present disclosure is applicable.

FIG. 6 is a view illustrating an observed time difference of arrival (OTDOA) method for positioning a terminal.

FIG. 7 is a view illustrating a pattern in which a positioning reference signal (PRS) is allocated to a resource element.

FIG. 8 is a flow chart illustrating an example of a positioning method of a terminal.

FIG. 9 is a view illustrating a process of requesting and receiving assistance data by a terminal from a base station.

FIG. 10 is a view illustrating a process of transmitting location information.

FIG. 11 is a view illustrating a process of transmitting assistance data to a physical layer and setting a measurement interval for reference signal time difference (RSTD) using a PRS period.

FIG. 12 is a view illustrating a periodic CSI-RS transmission method in a wireless communication system to which the present disclosure is applicable.

FIG. 13 is a view illustrating an aperiodic CSI-RS transmission method in a wireless communication system to which the present disclosure is applicable.

FIG. 14 is a view illustrating a CSI-RS configuration in a wireless communication system to which the present disclosure is applicable.

FIGS. 15 to 17 are views illustrating an example of small cell scenarios to which methods proposed in this disclosure is applicable.

FIG. 18 is a flow chart illustrating an example of a method for performing DRS-based positioning proposed in this disclosure.

FIG. 19 is a block diagram of a wireless communication device according to an embodiment of the present disclosure.

BEST MODES

Hereafter, preferred embodiments of the present invention will be described in detail with reference to the accompanying drawings. A detailed description to be disclosed hereinbelow together with the accompanying drawing is to describe embodiments of the present invention and not to describe a unique embodiment for carrying out the present invention. The detailed description below includes details in order to provide a complete understanding. However, those skilled in the art know that the present invention can be carried out without the details.

In some cases, in order to prevent a concept of the present invention from being ambiguous, known structures and devices may be omitted or may be illustrated in a block diagram format based on core function of each structure and device.

In the specification, a base station means a terminal node of a network directly performing communication with a terminal. In the present document, specific operations described to be performed by the base station may be performed by an upper node of the base station in some cases. That is, it is apparent that in the network constituted by multiple network nodes including the base station, various operations performed for communication with the terminal may be performed by the base station or other network nodes other than the base station. A base station (BS) may be generally substituted with terms such as a fixed station, Node B, evolved-NodeB (eNB), a base transceiver system (BTS), an access point (AP), and the like. Further, a 'terminal' may be fixed or movable and be substituted with terms such as user equipment (UE), a mobile station (MS), a user terminal (UT), a mobile subscriber station (MSS), a subscriber station (SS), an advanced mobile station (AMS), a wireless terminal (WT), a Machine-Type Communication (MTC) device, a Machine-to-Machine (M2M) device, a Device-to-Device (D2D) device, and the like.

Hereinafter, a downlink means communication from the base station to the terminal and an uplink means communication from the terminal to the base station. In the downlink, a transmitter may be a part of the base station and a receiver may be a part of the terminal. In the uplink, the transmitter may be a part of the terminal and the receiver may be a part of the base station.

Specific terms used in the following description are provided to help appreciating the present invention and the use of the specific terms may be modified into other forms within the scope without departing from the technical spirit of the present invention.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), non-orthogonal multiple access (NOMA), and the like. The CDMA may be implemented by radio technology universal terrestrial radio access (UTRA) or CDMA2000. The TDMA may be implemented by radio technology such as Global System for Mobile communications (GSM)/General Packet Radio Service (GPRS)/Enhanced Data Rates for GSM Evolution (EDGE). The OFDMA may be implemented as radio technology such as IEEE 802.11(Wi-Fi), IEEE 802.16(WiMAX), IEEE 802-20, E-UTRA (Evolved UTRA), and the like. The UTRA is a part of a universal mobile telecommunication system (UMTS). 3rd generation partnership project (3GPP) long term evolution (LTE) as a part of an evolved UMTS (E-UMTS) using evolved-UMTS terrestrial radio access (E-UTRA) adopts the OFDMA in a downlink and the SC-FDMA in an uplink. LTE-advanced (A) is an evolution of the 3GPP LTE.

The embodiments of the present invention may be based on standard documents disclosed in at least one of IEEE 802, 3GPP, and 3GPP2 which are the wireless access systems. That is, steps or parts which are not described to definitely show the technical spirit of the present invention among the embodiments of the present invention may be based on the documents. Further, all terms disclosed in the document may be described by the standard document.

3GPP LTE/LTE-A is primarily described for clear description, but technical features of the present invention are not limited thereto.

General System

FIG. 1 illustrates a structure a radio frame in a wireless communication system to which the present invention can be applied.

In 3GPP LTE/LTE-A, radio frame structure type 1 may be applied to frequency division duplex (FDD) and radio frame structure type 2 may be applied to time division duplex (TDD) are supported.

FIG. 1(a) exemplifies radio frame structure type 1. The radio frame is constituted by 10 subframes. One subframe is constituted by 2 slots in a time domain. A time required to transmit one subframe is referred to as a transmissions time interval (TTI). For example, the length of one subframe may be 1 ms and the length of one slot may be 0.5 ms.

One slot includes a plurality of orthogonal frequency division multiplexing (OFDM) symbols in the time domain and includes multiple resource blocks (RBs) in a frequency domain. In 3GPP LTE, since OFDMA is used in downlink, the OFDM symbol is used to express one symbol period. The OFDM symbol may be one SC-FDMA symbol or symbol period. The resource block is a resource allocation wise and includes a plurality of consecutive subcarriers in one slot.

FIG. 1(b) illustrates frame structure type 2. Radio frame type 2 is constituted by 2 half frames, each half frame is constituted by 5 subframes, a downlink pilot time slot (DwPTS), a guard period (GP), and an uplink pilot time slot (UpPTS), and one subframe among them is constituted by 2 slots. The DwPTS is used for initial cell discovery, synchronization, or channel estimation in a terminal.

The UpPTS is used for channel estimation in a base station and to match uplink transmission synchronization of the terminal. The guard period is a period for removing interference which occurs in uplink due to multi-path delay of a downlink signal between the uplink and the downlink.

In frame structure type 2 of a TDD system, an uplink-downlink configuration is a rule indicating whether the uplink and the downlink are allocated (alternatively, reserved) with respect to all subframes. Table 1 shows the uplink-downlink configuration.

TABLE 1

| Uplink-Downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 1, for each sub frame of the radio frame, 'D' represents a subframe for downlink transmission, represents a subframe for uplink transmission, and 'S' represents a special subframe constituted by three fields such as the DwPTS, the GP, and the UpPTS. The uplink-downlink configuration may be divided into 7 configurations and the positions and/or the numbers of the downlink subframe, the special subframe, and the uplink subframe may vary for each configuration.

A time when the downlink is switched to the uplink or a time when the uplink is switched to the downlink is referred to as a switching point. Switch-point periodicity means a period in which an aspect of the uplink subframe and the downlink subframe are switched is similarly repeated and both 5 ms or 10 ms are supported. When the period of the downlink-uplink switching point is 5 ms, the special subframe S is present for each half-frame and when the period of the downlink-uplink switching point is 5 ms, the special subframe S is present only in a first half-frame.

In all configurations, subframes #0 and #5 and the DwPTS are intervals only the downlink transmission. The UpPTS and a subframe just subsequently to the subframe are continuously intervals for the uplink transmission.

The uplink-downlink configuration may be known by both the base station and the terminal as system information. The base station transmits only an index of configuration information whenever the uplink-downlink configuration information is changed to announce a change of an uplink-downlink allocation state of the radio frame to the terminal. Further, the configuration information as a kind of downlink control information may be transmitted through a physical downlink control channel (PDCCH) similarly to other scheduling information and may be commonly transmitted to all terminals in a cell through a broadcast channel as broadcasting information.

The structure of the radio frame is just one example and the number subcarriers included in the radio frame or the number of slots included in the subframe and the number of OFDM symbols included in the slot may be variously changed.

FIG. 2 is a diagram illustrating a resource grid for one downlink slot in the wireless communication system to which the present invention can be applied.

Referring to FIG. 2, one downlink slot includes the plurality of OFDM symbols in the time domain. Herein, it is exemplarily described that one downlink slot includes 7 OFDM symbols and one resource block includes 12 sub-carriers in the frequency domain, but the present invention is not limited thereto.

Each element on the resource grid is referred to as a resource element and one resource block includes 12×7 resource elements. The number of resource blocks included in the downlink slot, NDL is subordinated to a downlink transmission bandwidth.

A structure of the uplink slot may be the same as that of the downlink slot.

FIG. 3 illustrates a structure of a downlink subframe in the wireless communication system to which the present invention can be applied.

Referring to FIG. 3, a maximum of three fore OFDM symbols in the first slot of the sub frame is a control region to which control channels are allocated and residual OFDM symbols is a data region to which a physical downlink shared channel (PDSCH) is allocated. Examples of the downlink control channel used in the 3GPP LTE include a Physical Control Format Indicator Channel (PCFICH), a Physical Downlink Control Channel (PDCCH), a Physical Hybrid-ARQ Indicator Channel (PHICH), and the like.

The PFCICH is transmitted in the first OFDM symbol of the subframe and transports information on the number (that is, the size of the control region) of OFDM symbols used for transmitting the control channels in the subframe. The PHICH which is a response channel to the uplink transports an Acknowledgement (ACK)/Not-Acknowledgement (NACK) signal for a hybrid automatic repeat request (HARQ). Control information transmitted through a PDCCH is referred to as downlink control information (DCI). The downlink control information includes uplink resource allocation information, downlink resource allocation information, or an uplink transmission (Tx) power control command for a predetermined terminal group.

The PDCCH may transport A resource allocation and transmission format (also referred to as a downlink grant) of a downlink shared channel (DL-SCH), resource allocation information (also referred to as an uplink grant) of an uplink shared channel (UL-SCH), paging information in a paging channel (PCH), system information in the DL-SCH, resource allocation for an upper-layer control message such as a random access response transmitted in the PDSCH, an aggregate of transmission power control commands for individual terminals in the predetermined terminal group, a voice over IP (VoIP). A plurality of PDCCHs may be transmitted in the control region and the terminal may monitor the plurality of PDCCHs. The PDCCH is constituted by one or an aggregate of a plurality of continuous control channel elements (CCEs). The CCE is a logical allocation wise used to provide a coding rate depending on a state of a radio channel to the PDCCH. The CCEs correspond to a plurality of resource element groups. A format of the PDCCH and a bit number of usable PDCCH are determined according to an association between the number of CCEs and the coding rate provided by the CCEs.

The base station determines the PDCCH format according to the DCI to be transmitted and attaches the control information to a cyclic redundancy check (CRC) to the control information. The CRC is masked with a unique identifier (referred to as a radio network temporary identifier (RNTI)) according to an owner or a purpose of the PDCCH. In the case of a PDCCH for a specific terminal, the unique identifier of the terminal, for example, a cell-RNTI (C-RNTI) may be masked with the CRC. Alternatively, in the case of a PDCCH for the paging message, a paging indication identifier, for example, the CRC may be masked with a paging-RNTI (P-RNTI). In the case of a PDCCH for the system information, in more detail, a system information block (SIB), the CRC may be masked with a system information identifier, that is, a system information (SI)-RNTI. The CRC may be masked with a random access (RA)-RNTI in order to indicate the random access response which is a response to transmission of a random access preamble.

FIG. 4 illustrates a structure of an uplink subframe in the wireless communication system to which the present invention can be applied.

Referring to FIG. 4, the uplink subframe may be divided into the control region and the data region in a frequency domain. A physical uplink control channel (PUCCH) transporting uplink control information is allocated to the control region. A physical uplink shared channel (PUSCH) transporting user data is allocated to the data region. One terminal does not simultaneously transmit the PUCCH and the PUSCH in order to maintain a single carrier characteristic.

A resource block (RB) pair in the subframe are allocated to the PUCCH for one terminal. RBs included in the RB pair occupy different subcarriers in two slots, respectively. The RB pair allocated to the PUCCH frequency-hops in a slot boundary.

Reference Signal (RS)

In the wireless communication system, since the data is transmitted through the radio channel, the signal may be distorted during transmission. In order for the receiver side to accurately receive the distorted signal, the distortion of the received signal needs to be corrected by using channel information. In order to detect the channel information, a signal transmitting method know by both the transmitter side and the receiver side and a method for detecting the channel information by using an distortion degree when the signal is transmitted through the channel are primarily used. The aforementioned signal is referred to as a pilot signal or a reference signal (RS).

Recently, when packets are transmitted in most of mobile communication systems, multiple transmitting antennas and multiple receiving antennas are adopted to increase trans-ceiving efficiency rather than a single transmitting antenna and a single receiving antenna. When the data is transmitted and received by using the MIMO antenna, a channel state between the transmitting antenna and the receiving antenna need to be detected in order to accurately receive the signal. Therefore, the respective transmitting antennas need to have individual reference signals.

Reference signal in a wireless communication system can be mainly categorized into two types. In particular, there are a reference signal for the purpose of channel information acquisition and a reference signal used for data demodulation. Since the object of the former reference signal is to enable a UE (user equipment) to acquire a channel information in DL (downlink), the former reference signal should be transmitted on broadband. And, even if the UE does not receive DL data in a specific subframe, it should perform a channel measurement by receiving the corresponding reference signal. Moreover, the corresponding reference signal can be used for a measurement for mobility management of a handover or the like. The latter reference signal is the reference signal transmitted together when a base station transmits DL data. If a UE receives the corresponding reference signal, the UE can perform channel estimation, thereby demodulating data. And, the corresponding reference signal should be transmitted in a data transmitted region.

The DL reference signals are categorized into a common reference signal (CRS) shared by all terminals for an acquisition of information on a channel state and a measurement associated with a handover or the like and a dedicated reference signal (DRS) used for a data demodulation for a specific terminal. Information for demodulation and channel measurement may be provided by using the reference signals. That is, the DRS is used only for data demodulation only, while the CRS is used for two kinds of purposes including channel information acquisition and data demodulation.

The receiver side (that is, terminal) measures the channel state from the CRS and feeds back the indicators associated with the channel quality, such as the channel quality indicator (CQI), the precoding matrix index (PMI), and/or the rank indicator (RI) to the transmitting side (that is, base station). The CRS is also referred to as a cell-specific RS. On the contrary, a reference signal associated with a feed-back of channel state information (CSI) may be defined as CSI-RS.

The DRS may be transmitted through resource elements when data demodulation on the PDSCH is required. The terminal may receive whether the DRS is present through the upper layer and is valid only when the corresponding PDSCH is mapped. The DRS may be referred to as the UE-specific RS or the demodulation RS (DMRS).

FIG. 5 illustrates a reference signal pattern mapped to a downlink resource block pair in the wireless communication system to which the present invention can be applied.

Referring to FIG. 5 as a unit in which the reference signal is mapped, the downlink resource block pair may be expressed by one subframe in the timedomain×12 subcarriers in the frequency domain. That is, one resource block pair has a length of 14 OFDM symbols in the case of a normal cyclic prefix (CP) (FIG. 12a) and a length of 12 OFDM symbols in the case of an extended cyclic prefix (CP) (FIG. 12b). Resource elements (REs) represented as 0, 1, 2, and '3' in a resource block lattice mean the positions of the CRSs of antenna port indexes '0', '1', '2', and '3', respectively and resource elements represented as 'D' means the position of the DRS.

Hereinafter, when the CRS is described in more detail, the CRS is used to estimate a channel of a physical antenna and distributed in a whole frequency band as the reference signal which may be commonly received by all terminals positioned in the cell. That is, the CRS is transmitted in each subframe across a broadband as a cell-specific signal. Further, the CRS may be used for the channel quality information (CSI) and data demodulation.

The CRS is defined as various formats according to an antenna array at the transmitter side (base station). The RSs are transmitted based on maximum 4 antenna ports depending on the number of transmitting antennas of a base station in the 3GPP LTE system (for example, release-8). The transmitter side has three types of antenna arrays of three single transmitting antennas, two transmitting antennas, and four transmitting antennas. For instance, in case that the number of the transmitting antennas of the base station is 2, CRSs for antenna #1 and antenna #2 are transmitted. For another instance, in case that the number of the transmitting antennas of the base station is 4, CRSs for antennas #1 to #4 are transmitted.

When the base station uses the single transmitting antenna, a reference signal for a single antenna port is arrayed.

When the base station uses two transmitting antennas, reference signals for two transmitting antenna ports are arrayed by using a time division multiplexing (TDM) scheme and/or a frequency division multiplexing (FDM) scheme. That is, different time resources and/or different frequency resources are allocated to the reference signals for two antenna ports which are distinguished from each other.

Moreover, when the base station uses four transmitting antennas, reference signals for four transmitting antenna ports are arrayed by using the TDM and/or FDM scheme. Channel information measured by a downlink signal receiving side (terminal) may be used to demodulate data transmitted by using a transmission scheme such as single transmitting antenna transmission, transmission diversity, closed-loop spatial multiplexing, open-loop spatial multiplexing, or multi-user MIMO.

In the case where the MIMO antenna is supported, when the reference signal is transmitted from a specific antenna port, the reference signal is transmitted to the positions of specific resource elements according to a pattern of the reference signal and not transmitted to the positions of the specific resource elements for another antenna port. That is, reference signals among different antennas are not duplicated with each other.

A rule of mapping the CRS to the resource block is defined as below.

$$k = 6m + (v + v_{shift}) \bmod 6 \quad [\text{Equation 1}]$$

$$l = \begin{cases} 0, N_{symb}^{DL} - 3 & \text{if } p \in \{0, 1\} \\ 1 & \text{if } p \in \{2, 3\} \end{cases}$$

$$m = 0, 1, \ldots, 2 \cdot N_{RB}^{DL} - 1$$

$$m' = m + N_{RB}^{max,DL} - N_{RB}^{DL}$$

$$v = \begin{cases} 0 & \text{if } p = 0 \text{ and } l = 0 \\ 3 & \text{if } p = 0 \text{ and } l \neq 0 \\ 3 & \text{if } p = 1 \text{ and } l = 0 \\ 0 & \text{if } p = 1 \text{ and } l \neq 0 \\ 3(n_s \bmod 2) & \text{if } p = 2 \\ 3 + 3(n_s \bmod 2) & \text{if } p = 3 \end{cases}$$

$$v_{shift} = N_{ID}^{cell} \bmod 6$$

In Equation 1, k and l represent the subcarrier index and the symbol index, respectively and p represents the antenna port. $N_{symb}^{DL}$ represents the number of OFDM symbols in one downlink slot and $N_{RB}^{DL}$ represents the number of radio resources allocated to the downlink. ns represents a slot index and, $N_{ID}^{cell}$ represents a cell ID. mod represents an modulo operation. The position of the reference signal varies depending on the $v_{shift}$ value in the frequency domain. Since $v_{shift}$ depends on the cell ID, the position of the reference signal has various frequency shift values according to the cell.

In more detail, the position of the CRS may be shifted in the frequency domain according to the cell in order to improve channel estimation performance through the CRS. For example, when the reference signal is positioned at an interval of three subcarriers, reference signals in one cell are allocated to a 3k-th subcarrier and a reference signal in another cell is allocated to a 3k+1-th subcarrier. In terms of one antenna port, the reference signals are arrayed at an interval of six resource elements in the frequency domain and separated from a reference signal allocated to another antenna port at an interval of three resource elements.

In the time domain, the reference signals are arrayed at a constant interval from symbol index 0 of each slot. The time interval is defined differently according to a cyclic shift length. In the case of the normal cyclic shift, the reference signal is positioned at symbol indexes 0 and 4 of the slot and in the case of the extended CP, the reference signal is positioned at symbol indexes 0 and 3 of the slot. A reference signal for an antenna port having a maximum value between two antenna ports is defined in one OFDM symbol. Therefore, in the case of transmission of four transmitting antennas, reference signals for reference signal antenna ports 0 and 1 are positioned at symbol indexes 0 and 4 (symbol indexes 0 and 3 in the case of the extended CP) and reference signals for antenna ports 2 and 3 are positioned at symbol index 1 of the slot. The positions of the reference signals for antenna ports 2 and 3 in the frequency domain are exchanged with each other in a second slot.

Hereinafter, when the DRS is described in more detail, the DRS is used for demodulating data. A precoding weight used for a specific terminal in the MIMO antenna transmission is used without a change in order to estimate a channel associated with and corresponding to a transmission channel transmitted in each transmitting antenna when the terminal receives the reference signal.

The 3GPP LTE system (for example, release-8) supports a maximum of four transmitting antennas and a DRS for rank 1 beamforming is defined. The DRS for the rank 1 beamforming also means a reference signal for antenna port index 5.

A rule of mapping the DRS to the resource block is defined as below. Equation 2 shows the case of the normal CP and Equation 3 shows the case of the extended CP.

$$k = (k') \bmod N_{sc}^{RB} + N_{sc}^{RB} \cdot n_{PRB} \quad \text{[Equation 2]}$$

$$k' = \begin{cases} 4m' + v_{shift} & \text{if } l \in \{2, 3\} \\ 4m' + (2 + v_{shift}) \bmod 4 & \text{if } l \in \{5, 6\} \end{cases}$$

$$l = \begin{cases} 3 & l' = 0 \\ 6 & l' = 1 \\ 2 & l' = 2 \\ 5 & l' = 3 \end{cases}$$

$$l' = \begin{cases} 0, 1 & \text{if } n_s \bmod 2 = 0 \\ 2, 3 & \text{if } n_s \bmod 2 = 1 \end{cases}$$

$$m' = 0, 1, \ldots, 3N_{RB}^{PDSCH} - 1$$

$$v_{shift} = N_{ID}^{cell} \bmod 3$$

$$k = (k') \bmod N_{sc}^{RB} + N_{sc}^{RB} \cdot n_{PRB} \quad \text{[Equation 3]}$$

$$k' = \begin{cases} 3m' + v_{shift} & \text{if } l = 4 \\ 3m' + (2 + v_{shift}) \bmod 3 & \text{if } l = 1 \end{cases}$$

$$l = \begin{cases} 4 & l' \in \{0, 2\} \\ 1 & l' = 1 \end{cases}$$

$$l' = \begin{cases} 0 & \text{if } n_s \bmod 2 = 0 \\ 1, 2 & \text{if } n_s \bmod 2 = 1 \end{cases}$$

$$m' = 0, 1, \ldots, 4N_{RB}^{PDSCH} - 1$$

$$v_{shift} = N_{ID}^{cell} \bmod 3$$

In Equations 2 and 3, k and l represent the subcarrier index and the symbol index, respectively and p represents the antenna port. $N_{sc}^{RB}$ represents the size of the resource block in the frequency domain and is expressed as the number of subcarriers. $n_{PRB}$ represents the number of physical resource blocks. $N_{RB}^{PDSCH}$ represents a frequency band of the resource block for the PDSCH transmission. ns represents the slot index and $N_{ID}^{cell}$ represents the cell ID. mod represents the modulo operation. The position of the reference signal varies depending on the $v_{shift}$ value in the frequency domain. Since $v_{shift}$ depends on the cell ID, the position of the reference signal has various frequency shift values according to the cell.

In an LTE-A system which is an evolved and developed form of an LTE system, a maximum of 8 transmitting antennas need to be designed to be supported to the downlink of the base station. Accordingly, RSs for a maximum of 8 transmitting antennas also need to be supported. In the LTE system, in the case of the downlink RS, since only RSs for a maximum of 4 antenna ports are defined, when the base station has 4 to a maximum of 8 downlink transmitting antennas in the LTE-A system, the RSs for the antennas ports need to be additionally defined and designed. In the case of a maximum of 8 transmitting antenna ports, both the RS for the above described channel measurement and the RS for data demodulation need to be designed.

One among important considerations in designing the LTE-A system backward compatibility, that is, that an LTE terminal needs to operate normally without unstudied ease even in the LTE-A system and the system also needs to support the backward compatibility. From an RS transmission viewpoint, in a time-frequency domain in which the CRS defined in the LTE is transmitted in a full band every subframe, the RSs for a maximum of 8 transmitting antennas need to be additionally defined. In the LTE-A system, when RS patterns for a maximum of 8 transmitting antennas are added to the full band every subframe by the method such as the CRS of the LTE in the related art, RS overhead is excessively increased.

Accordingly, newly designed RSs are largely divided into two categories in the LTE-A system and are RSs (CSI-RS, Channel State Information-RS, Channel State Indication-RS, and the like) for channel measurement for selection such as an MCS, a PMI, and the like and RSs (Data Demodulation-RS (DM-RS)) for demodulating data transmitted to 8 transmitting antennas.

The CSI-RS for the channel estimation is designed for is designed primarily for the channel measurement unlike a case where the CRS in the related art is used for measurement including the channel measurement, handover, and the like and the data demodulation. Of course, the CSI-RS may also be used even for the measurement including the handover, and the like. Since the CSI-RS is transmitted only for a purpose of acquiring information on a channel state, the CSI-RS may not be transmitted even subframe unlike the CRS. In order to reduce the overhead of the CSI-RS, the CSI-RS is intermittently transmitted on a time axis.

The DM RS is dedicatedly transmitted to the UE scheduled in the corresponding time-frequency domain for the data demodulation. That is, the DM-RS of specific UE is transmitted only to a region in which the corresponding UE is scheduled, that is, the time-frequency domain to receive data.

In the LTE-A system, the eNB needs to transmit the CSI-RSs for all antenna ports. Since the overhead is a too large disadvantage in that the CSI-RSs for a maximum of 8 transmitting antenna ports are transmitted every subframe, only the CSI-RS is not transmitted every subframe and is intermittently transmitted on the time axis, the overhead may be reduced. That is, the CSI-RS may be transmitted periodically at an integer-multiple period of one subframe or transmitted in a specific transmission pattern. In this case, the period or pattern in which the CSI-RS may be set by the eNB.

In order to measure the CSI-RS, the UE particularly needs to find information on a transmission subframe index of the CSI-RS for each CSI-RS antenna port to which the UE belongs, a CSI-RS resource element (RE) time-frequency position within a transmission subframe, and a CSI-RS sequence.

In the LTE-A system, the eNB needs to transmit the CSI-RSs with respect to a maximum of 8 antenna ports. Resources for transmitting the CSI-RS of different antenna ports need to be orthogonal to each other. One eNB maps the CSI-RSs for the respective antenna ports to different REs at the time of transmitting the CSI-RSs for the different antenna ports to orthogonally allocate the resources by an FDM/TDM method. Alternatively, the CSI-RSs for the different antenna ports may be transmitted by a CDM method in which the CSI-RSs are mapped to codes orthogonal to each other.

When the eNB announces information on the CSI-RS to the UE of the cell of eNB, the eNB first needs to announce information on a time-frequency to which the CSI-RS for each antenna port is mapped. In detail, the information is subframe numbers in which the CSI-RS is transmitted or the period in which the CSI-RS is transmitted and a subframe offset in which the CSI-RS is transmitted and includes an OFDM symbol number in which the CSI-RS RE of a specific antenna is transmitted, frequency spacing, an offset or shift value of the RE on a frequency axis, and the like.

Cell Measurement/Measurement Report

For one or several methods among several methods (handover, random access, cell search, and the like) for guaranteeing mobility of the UE, the UE reports a result of cell measurement to the base station (alternatively, the network).

In the 3GPP LTE/LTE-A system, the cell specific reference signal (CRS) is transmitted through 0, 4, 7, and 11-th OFDM symbols in each subframe on the time axis and the CRS is basically used. That is, the UE performs the cell measurement by using the CRS received from each of a serving cell and a neighbor cell.

The cell measurement is a concept including radio resource management (RPM) measurement of reference signal receive power (RSRP), a received signal strength indicator (RSSI), a reference signal received quality (RSRQ), and the like to measure signal strengths of the serving cell and the neighbor cell or a total received power to signal strength and radio link monitoring (RLM) measurement to evaluate a radio link failure by measuring a link quality with the serving cell.

The RSRP is a liner mean of power distribution of the RE in which the CRS is transmitted within a measurement frequency band. CRS(R0) corresponding to antenna port '0' may be used for determining the RSRP. Further, CRS(R1) corresponding to antenna port '1' may be used for determining the RSRP. The number of REs in a measurement frequency band and a measurement interval used by the UE in order to determine the RSRP may be determined by the UE within a limit in which corresponding accuracy requirements are satisfied. Further, power per RE may be determined from energy received within a remaining part of a symbol except for a cyclic prefix (CP).

The RSSI is derived by the linear mean of total received power sensed from all sources by the corresponding UE, which include the serving cell and a non-serving cell of a co-channel, interference from an adjacent channel, thermal noise, and the like in OFDM symbols including the RS corresponding to antenna port '0' within the measurement band. When specific subframes for measuring the RSRQ are indicated by higher layer signaling, the RSSI is measured through all OFDM symbols within the indicated subframes.

The RSRQ is derived by xRSRP/RSSI. Herein, N represents the number of RBs in an RSSI measurement bandwidth. Further, in the above equation, a denominator and a numerator may be measured in the same set of RBs.

The base station may transfer configuration information for the measurement to the UE through the higher layer signaling (for example, an RRC connection reconfiguration message).

The RRC connection reconfiguration message includes a radio resource configuration dedicated ('radioResourceConfigDedicated') information element (IE) and a measurement configuration ('measConfig') IE.

The 'measConfig' IE specifies the measurement which needs to be performed by the UE and includes configuration information for intra-frequency mobility, inter-frequency mobility, and inter-RAT mobility as well as a configuration of a measurement gap.

In particular, the 'measConfig' IE includes 'measObjectToRemoveList' representing a list of a measurement object 'measObject' to be removed in the measurement and 'measObjectToAddModList' representing a list to be newly added or modified. Further, the 'measObject' includes 'MeasObjectCDMA2000', 'MeasObjctEUTRA', 'MeasObjectGERAN', and the like according to communication technology.

The 'RadioResourceConfigDedicated' IE is used for setting up/modifying/releasing a radio bearer, changing a semi-persistent scheduling configuration and changing a dedicated physical configuration.

The 'RadioResourceConfigDedicated' IE includes a 'measSubframePattern-Serv' field indicating a time domain measurement resource restriction pattern for serving cell measurement. Further, the 'RadioResourceConfigDedicated' IE includes 'measSubframeCellList' indicating the neighbor cell to be measured by the UE and 'measSubframePattern-Neigh' indicating the time domain measurement resource restriction pattern for neighbor cell measurement.

The time domain measurement resource restriction pattern configured for the measurement cell (including the serving cell and the neighbor cell) may indicate one subframe per radio frame for measuring the RSRQ. The RSRQ is not measured in subframes other than the subframe indicated by the time domain measurement resource restriction pattern configured for the measurement cell.

As such, the UE (for example, 3GPP Rel-10) needs to measure the RSRQ only in an interval configured by a subframe pattern 'measSubframePattern-Serv' for the serving cell measurement and a subframe pattern 'measSubframePattern-Neigh' for the neighbor cell measurement.

However, the measurement of the RSRP in the pattern is not restricted, but measuring the RSRP only within the pattern is preferable for the accuracy requirements.

Observed Time Difference of Arrival (OTDOA) Method

Hereinafter, the OTDOA method will be described in more detail.

FIG. 6 is a diagram illustrating an OTDOA method for positioning of a terminal.

Referring to FIG. 6, since the terminal performs a reference clock based on the subframe transmitted in the current serving cell, the signals received from the neighboring cells have different time of arrivals (TOA).

The serving cell and the neighboring cell may be expressed as a serving base station and a neighboring base station, respectively.

That is, in the OTDOA method, the terminal measures the position of the terminal by using a timing difference when the signals transmitted from the respective cells reach the terminal and since a reference cell is a cell which is a reference of a TDOA, a time required to receive the signal from one reference cell and a delay time of the signals received from a plurality of neighboring cells, respectively are measured by using a reference signal or a synchronization signal received from the plurality of neighboring cells to report the measured time and delay time to the serving cell or an anchor cell and the serving cell measures the position of the corresponding terminal by using the reported delay time.

Herein, the reference cell may mean a cell which may be a reference of the time difference of arrival (TDOA) and when the serving cell corresponds to the reference cell and the terminal performs the operations including the handover, and the like, the reference cell may correspond to the serving cell before the handover operation or the reference cell may not be changed regardless of the handover operation of the terminal, and the like.

As a measurement signal for positioning of the terminal, a common reference signal (CRS) or a primary synchronization signal/secondary synchronization signal (PSS/SSS) may be used, but a dedicated positioning reference signal (PRS) for a location service (LCS) may be used.

The positioning reference signal may be expressed as the positioning reference signal or a positioning pilot signal.

Hereinafter, the PRS will be described as an example as the measurement signal used for positioning of the terminal for easy description.

Positioning Reference Signal (PRS)

Next, the positioning reference signal (hereinafter, referred to as "PRS") will be described.

The PRS as the reference signal used for positioning of the terminal is transmitted only through resource blocks of the downlink subframe determined for transmitting the PRS.

A PRS sequence is defined by Equation 4.

$$r_{l,n_s}(m) = \frac{1}{\sqrt{2}}(1 - 2 \cdot c(2m)) + j\frac{1}{\sqrt{2}}(1 - 2 \cdot c(2m+1)),$$ [Equation 4]

$$m = 0, 1, \ldots, 2N_{RB}^{max,DL} - 1$$

Where, $r_{l,n_s(m)}$ represents the PRS sequence, $n_s$ represents a slot number in a frame, and l represents an OFDM symbol number in a slot. c(i) represents a pseudo-random sequence and a pseudo-random sequence generator is initialized to $c_{int}$ shown in Equation 5 at a start point of each OFDM symbol.

$$c_{init} = 2^{10} \cdot (7 \cdot (n_s+1)+l+1) \cdot (2 \cdot N_{ID}^{cell}+1)+2 \cdot N_{ID}^{cell}+N_{CP}$$ [Equation 5]

Where, $N_{ID}^{cell}$ represents a physical layer cell ID and $N_{CP}$ is 1 when the OFDM symbol a normal cyclic prefix (CP) and 0 when the OFDM symbol has an extended CP.

The PRS sequence $r_{l,n_s(m)}$ may be mapped to complex-valued modulation symbols $a_{k,l}^{(p)}$ used as the reference signal for antenna port 6 (p=6) in a slot $n_s$ configured for transmitting the reference signal according Equation 6.

$$a_{k,l}^{(p)} = r_{l,n_s}(m')$$ [Equation 6]

Where, a resource index pair (k,l) for transmitting the reference signal and m and m' values may be determined according to Equation 7 or 8 given below. Herein, Equation 7 shows the case of the normal cyclic prefix and Equation 8 shows the case of the extended cyclic prefix.

$$k = 6(m + N_{RB}^{DL} - N_{RB}^{PRS}) + (6 - l + v_{shift}) \bmod 6$$ [Equation 7]

$$l = \begin{cases} 3, 5, 6 & \text{if } n_s \bmod 2 = 0 \\ 1, 2, 3, 5, 6 & \text{if } n_s \bmod 2 = 1 \text{ and} \\ & (1 \text{ or } 2 \text{ } PBCH \text{ antenna ports}) \\ 2, 3, 5, 6 & \text{if } n_s \bmod 2 = 1 \text{ and} \\ & (4 \text{ } PBCH \text{ antenna ports}) \end{cases}$$

$$m = 0, 1, \ldots, 2 \cdot N_{RB}^{PRS} - 1$$

$$m' = m + N_{RB}^{max,DL} - N_{RB}^{PRS}$$

$$k = 6(m + N_{RB}^{DL} - N_{RB}^{PRS}) + (5 - l + v_{shift}) \bmod 6$$ [Equation 8]

$$l = \begin{cases} 4, 5 & \text{if } n_s \bmod 2 = 0 \\ 1, 2, 4, 5 & \text{if } n_s \bmod 2 = 1 \text{ and} \\ & (1 \text{ or } 2 \text{ } PBCH \text{ antenna ports}) \\ 2, 4, 5 & \text{if } n_s \bmod 2 = 1 \text{ and} \\ & (4 \text{ } PBCH \text{ antenna ports}) \end{cases}$$

$$m = 0, 1, \ldots, 2 \cdot N_{RB}^{PRS} - 1$$

$$m' = m + N_{RB}^{max,DL} - N_{RB}^{PRS}$$

Herein, a bandwidth of the reference signal and the number $N_{RB}^{PR3}$ of resource blocks are configured by a higher layer. In addition, the reference signal has different frequency shift ($v_{shift}$) values for each cell and such a cell-specific frequency shift is determined according to Equation 9 given below.

$$v_{shift} = N_{ID}^{cell} \bmod 6$$ [Equation 9]

By such a method, when a preamble signal is mapped to the radio resource, a structure of a preamble transmitted in a specific subframe is shown in FIG. 7 to be described below.

FIG. 7 is a diagram illustrating a pattern in which a PRS is allocated to a resource element. FIG. 7(a) illustrates the case of the normal CP and FIG. 7(b) illustrates the case of the extended CP.

Positioning Method of Terminal

Net, the positioning method of the terminal will be described.

That is, according to the positioning method of the terminal using the PRS, the terminal receives assistance data from the serving base station and receives the PRS from the reference cell and the neighboring cells by using the assistance data, and calculate a reference signal time difference (hereinafter, referred to as "RSTD") between the reference cell and the neighboring cells and transmits the calculated reference signal time difference to the serving base station.

Thereafter, the serving base station transmits the RSTD to a location server and the location server determines the position of the terminal by using the RSTD.

The RSTD means a relative timing difference between the reference cell and the neighboring cell and is defined by Equation 10.

$$T_{subframeRxj} - T_{subframeRxi}$$ [Equation 10]

Where, $T_{subframeRxj}$ represents a time when the terminal receives the start point of one subframe from neighboring cell j and $T_{subframeRxi}$ represents a time when the terminal receives from the reference cell i the start point of one subframe closest to one subframe received from the cell j as reference cell i.

The reference cell and the neighboring cells may transmit the PRS at a similar time and when the reference cell and the neighboring cells transmit the PRS at the similar time, a difference between a time when the terminal receives the PRS from the reference cell and a time when the terminal receives the PRS from each of the plurality of neighboring cells are within a predetermined time range.

For example, a difference between the time between the time when the terminal receives the PRS from the reference cell and the time when the terminal receives the PRS from each of the plurality of neighboring cells may be within one subframe.

Then, in defining the RSTD, when one subframe in which the terminal receives from the neighboring cell j is a first subframe of PRS positioning occasions of the neighboring cell j, one subframe received from the cell i closet to one subframe received from the cell j becomes a first subframe of the PRS positioning occasions of the reference cell i.

In this case, the PRS positioning occasions mean consecutive downlink subframes to which the PRS is allocated. Accordingly, the RSTD becomes a difference between the time of receiving the PRS from the neighboring cell j and the time of receiving the PRS from the reference cell i.

In this case, the time of receiving the PRS from the specific cell is referred to as a time of arrival (hereinafter, referred to as "TOA") of the PRS.

The positioning method of the terminal using the PRS will be described in more detail with reference to FIG. 8.

FIG. 8 is a flowchart illustrating one example of a positioning method of a terminal.

As illustrated in FIG. 8, the higher layer of the terminal receives the assistance data from the location server (S810).

The assistance data may include information on the reference cell and/or at least one neighboring cell required for the terminal to calculate the RSTD.

Thereafter, when the higher layer of the terminal receives the assistance data, the higher layer of the terminal transfers to the assistance data to the physical layer (S820).

Thereafter, as indicated in the transferred assistance data, the physical layer of the terminal configures the measurement interval for the RSTD by using a PRS transmission period of each of the plurality of cells (S830).

When the measurement interval for the RSTD for each of the plurality of cells is configured by using the PRS transmission period, the terminal correspondingly calculates the RSTD and transmits or reports the calculated RSTD value to the location server (S840).

Hereinafter, each step for positioning of the terminal will be described in detail.

First, the step (S810) in which the terminal receives the assistance data in the higher layer is described.

The terminal may request the assistance data to the location server through the base station and receive the requested assistance data.

FIG. 9 is a diagram illustrating a process in which a terminal requests assistance data to a base station and receives the requested assistance data.

As illustrated in FIG. 9, the terminal transmits an assistance data request (RequestAssistanceData) message to the location server through the base station and the location server transmits an assistance data providing message (ProvideAssistanceData) message including the assistance data to the terminal.

Herein, the location server may transmit an additional assistance data providing message including additional assistance data to the terminal.

The assistance data providing message which the location transmits last includes an end transaction indicator indicating that the corresponding message is a last message.

Alternatively, the location server may transmit the assistance data providing message without a request of the terminal.

Meanwhile, the terminal (alternatively, a target device) and the location server may transmit positional information to each other. FIG. 10 is a diagram illustrating a process of transmitting positional information.

The location server transmits a positional information request (RequestLocationInformation) message to the terminal in order to request the positional information. In this case, a type of required positional information may be indicated or additional sub QoS may be indicated.

Thereafter, the terminal transmits a positional information providing (request (ProvidedLocationInformation) message to the location server in order to transmit the positional information.

The transmitted positional information needs to match positional information required in the previous step or be a subset when the server does not definitely permit additional positional information.

When the positional information is requested, the terminal transmits an additional positional information providing (request (ProvidedLocationInformation) message to the server in order to transmit the positional information.

The transmitted positional information needs to match the positional information required in the previous step or be the subset when the server does not definitely permit additional positional information.

The providing message which is transmitted last includes the end transaction indicator indicating that the corresponding message is the last message.

Next, the assistance data received by the terminal will be described in more detail.

Table 2 is a table showing OTDOA assistance data included in the assistance data providing message.

TABLE 2

-- ASN1START
OTDOA-ProvideAssistanceData ::= SEQUENCE {
    otdoa-ReferenceCellInfo    OTDOA-ReferenceCellInfo
        OPTIONAL, -- Need ON
    otdoa-NeighbourCellInfo
    OTDOA-NeighbourCellInfoList    OPTIONAL, --
Need ON
    otdoa-Error    OTDOA-Error
        OPTIONAL, -- Need ON
    ...
}
-- ASN1STOP As shown in Table 2, the OTDOA assistance data includes OTDOA reference cell information (otdoa-ReferenceCellInfo) and OTDOA neighboring cell information (otdoa-NeighbourCellInfo).

First, the OTDOA reference cell information (otdoa-ReferenceCellInfo) included in the OTDOA assistance data is described.

Table 3 is a table showing the OTDOA reference cell information.

TABLE 3

```
-- ASN1START
OTDOA-ReferenceCellInfo ::= SEQUENCE {
    physCellId              INTEGER (0..503),
    cellGlobalId            ECGI
            OPTIONAL,        -- Need ON
    earfcnRef               ARFCN-ValueEUTRA
            OPTIONAL,        -- Cond NotSameAsServ0
    antennaPortConfig       ENUMERATED {ports1-or-2, ports4, ... }
                            OPTIONAL,    -- Cond NotSameAsServ1
    cpLength                ENUMERATED { normal, extended, ... },
    prsInfo                 PRS-Info
            OPTIONAL,        -- Cond PRS
    ...,
    [[ earfcnRef-v9a0       ARFCN-ValueEUTRA-v9a0
            OPTIONAL         -- Cond NotSameAsServ2
    ]]
}
-- ASN1STOP
```

The OTDOA reference cell information includes information on the reference cell.

As shown in Table 3, the OTDOA reference cell information includes a physical cell identity (physCellId), an antenna port configuration (antennaPortConfig), a cyclic prefix length (cpLength), and PRS information (prsInfo).

The physCellId represents the physical cell ID of the reference cell and the antennaPortConfig represents whether the reference cell uses at least one antenna port or 4 antenna ports for the cell-specific reference signal.

The cpLength means length information of the CP used at the time when the reference cell transmits the PRS. The prsInfo in information included in the OTDOA reference cell information (otdoa-ReferenceCellInfo) will be described in more detail with reference to Table 4.

Table 4 is a table showing the prsInfo.

TABLE 4

```
-- ASN1START
PRS-Info ::= SEQUENCE {
    prs-Bandwidth           ENUMERATED { n6, n15, n25, n50, n75, n100, ... },
    prs-ConfigurationIndex  INTEGER (0..4095),
    numDL-Frames            ENUMERATED {sf-1, sf-2,
```

TABLE 4-continued

```
sf-4, sf-6, ...},
    ...,
    prs-MutingInfo-r9       CHOICE {
        po2-r9                  BIT STRING (SIZE(2)),
        po4-r9                  BIT STRING (SIZE(4)),
        po8-r9                  BIT STRING (SIZE(8)),
        po16-r9                 BIT STRING (SIZE(16)),
        ...
    }                       OPTIONAL      -- Need OP
}
-- ASN1STOP
```

As shown in Table 4, the prsInfo includes a PRS bandwidth (prs-Bandwidth), a PRS configuration index (prs-ConfigurationIndex), a downlink frame number (numDL-Frames), and PRS muting information (prs-MutingInfo).

The prs-Bandwidth represents the bandwidth used for configuring the PRS and the numDL-Frames represents the number (Nprs) of consecutive downlink subframes to which the PRS is allocated.

The prs-MutingInfo represents a PRS muting configuration of the corresponding cell. The PRS muting configuration is defined by a periodic PRS muting sequence having a period of TPRS and the TPRS is represented by the number of PRS positioning occasions. The positioning occasions include Nprs downlink subframes.

The PRS muting information may be defined based on a system frame number (SFN) of the serving cell or the reference cell. When the PRS muting information is defined based on the SFN of the serving cell, a first bit of the PRS muting sequence corresponds to a first positioning occasion which starts after the start point of a frame in which the system frame number (SFN) of the serving cell is 0 and when the PRS muting information is defined based on the SFN of the reference cell, the first bit of the PRS muting sequence corresponds to the first positioning occasion which starts after the start point of the frame in which the SFN of the serving cell is 0.

The prs-ConfigurationIndex represents the PRS configuration index. The PRS configuration index IPRS represents information on the time when the PRS is transmitted.

Next, the OTDOA neighboring cell information (otdoa-NeighbourCellInfo) included in the OTDOA assistance data will be described.

Table 5 is a table showing the OTDOA neighboring cell information.

TABLE 5

```
-- ASN1START
OTDOA-NeighbourCellInfoList ::= SEQUENCE (SIZE (1..maxFreqLayers)) OF
OTDOA-NeighbourFreqInfo
OTDOA-NeighbourFreqInfo    ::=    SEQUENCE (SIZE (1..24))    OF
OTDOA-NeighbourCellInfoElement
OTDOA-NeighbourCellInfoElement ::= SEQUENCE {
    physCellId                                              INTEGER
(0..503),
    cellGlobalId                                            ECGI
            OPTIONAL,        -- Need ON
    earfcn
    ARFCN-ValueEUTRA OPTIONAL,          -- Cond NotSameAsRef0
    cpLength
    ENUMERATED {normal, extended, ...}
                            OPTIONAL,    --    Cond
NotSameAsRef1
    prsInfo                                                 PRS-Info
            OPTIONAL,        -- Cond NotSameAsRef2
    antennaPortConfig                                       ENUMERATED
```

TABLE 5-continued

```
{ports-1-or-2, ports-4, ...}
                              OPTIONAL,         --           Cond
NotsameAsRef3
      slotNumberOffset                          INTEGER (0..19)
            OPTIONAL,         -- Cond NotSameAsRef4
      prs-SubframeOffset                        INTEGER (0..1279)
      OPTIONAL,               -- Cond InterFreq
      expectedRSTD                                      INTEGER
(0..16383),
      expectedRSTD-Uncertainty       INTEGER (0..1023),
      ...,
      [[ earfcn-v9a0
      ARFCN-ValueEUTRA-v9a0   OPTIONAL          --           Cond
NotSameAsRef5
      ]]
}
maxFreqLayers     INTEGER ::= 3
-- ASN1STOP
```

As shown in Table 5, the OTDOA neighboring cell information may include at least one OTDOA neighboring cell information element (OTDOANeighbourCellInfoElement) and a plurality of OTDOA neighboring cell information elements included in the OTDOA neighboring cell information may be arranged in a descending order of the neighboring cell with respect to the RSTD measurement of the terminal.

That is, a first OTDOA neighboring cell information element included in the OTDOA neighboring cell information may be an OTDOA neighboring cell information element of the neighboring cell having a highest priority with respect to the RSTD measurement of the terminal.

Each of the OTDOA neighboring cell elements includes the physical cell identity (physCellId), the cyclic prefix length (cpLength), the PRS information (prsInfo), the antenna port configuration (antennaPortConfig), a slot number offset (slotNumberOffset), a PRS subframe offset (prs-SubframeOffset), an expected RSTD value (expectedRSTD), and uncertainty of the expected RSTD value (expectedRSTDUncertainty).

The physCellId represents the physical cell ID of the neighboring cell and the antennaPortConfig represents whether the neighboring cell uses one (alternatively, two) antenna ports or 3 antenna ports for the cell-specific reference signal.

The cpLength represents the length of the cyclic prefix of the PRS of the neighboring cell.

The prsInfo represents information on the PRS configuration of the neighboring cell. The prsInfo included in the OTDOA neighboring cell information element has the same form as the prsInfor included in the OTDOA reference cell information shown in Table 3. That is, the prsInfo includes the prs-Bandwidth, the prs-Configuration Index, the numDL-Frames, and the prs-MutingInfo.

The prs-Bandwidth represents the bandwidth used for transmitting the PRS of the neighboring cell, the numDL-Frames represents the predetermined number (Nprs) of consecutive downlink subframe to which the PRS of the neighboring cell is allocated, the prs-MutingInfo represents the PRS muting configuration of the neighboring cell, and the prs-ConfigurationIndex represents the PRS configuration index of the neighboring cell.

The slotNumberOffset represents the slot number offset of the reference cell and the neighboring cell. The slot number offset means an offset from the start point of a specific radio frame of the reference cell up to the start point of the radio frame of the neighboring cell which appears first after the specific radio frame. The slot number offset may be expressed by the number of slots and when the slot timing of the neighboring cell is the same as that of the reference cell, the slotNumberOffset field may be omitted.

The prs-SubframeOffset represents offsets of a specific first PRS subframe of the reference cell at a reference carrier frequency and a first PRS subframe of a PRS burst of the neighboring cell, which appears first after the first PRS subframe at another carrier frequency and is expressed by the number of subframes.

The expectedRSTD is an RSTD value which the terminal is expected to measure. When Ts is 1/(15000*2048) seconds, a resolution of the expectedRSTD is 3 Ts.

The expectedRSTD-Uncertainty represents uncertainty of the expectedRSTD value. That is, the expectedRSTDUncertainty represents an error range of the expectedRSTD value. The uncertainty of the expectedRSTD value is associated with estimation of the position of the terminal by the location server. The expectedRSTD-Uncertainty defines a search window of the terminal shown in Equation 11 and the resolution of the expectedRSTD-Uncertainty is 3 Ts.

[expectedRSTD−expectedRSTD$_{Uncertainty}$<measure RSTD<expectedRSTD|expectedRSTD$_{Uncertainty}$] [Equation 11]

Referring back to the description of the step for positioning of the terminal, when the higher layer of the terminal receives the assistance data from the location server, the higher layer transfers the assistance data to the physical layer (S820) and the physical layer configures the measurement interval for the RSTD by using the PRS transmission period of each of the plurality of cells as indicated by the transferred assistance data (S830).

In this regard, a method for determining the PRS transmission period according to the PRS configuration index included in the prsInfo will be described.

Table 6 shows the PRS transmission period (TPRS) and the PRS subframe offset $\Delta$PRS depending on the PRS configuration index.

TABLE 6

| PRS configuration Index $I_{PRS}$ | PRS periodicity $T_{PRS}$ (subframes) | PRS subframe offset $\Delta_{PRS}$ (subframes) |
|---|---|---|
| 0-159 | 160 | $I_{PRS}$ |
| 160-479 | 320 | $I_{PRS}$ − 160 |
| 480-1119 | 640 | $I_{PRS}$ − 480 |
| 1120-2399 | 1280 | $I_{PRS}$ − 1120 |
| 2400-4095 | Reserved | |

The physical layer receives the PRS configuration index from the higher layer. The PRS is transmitted only in the configured subframe and transmitted in NPRS consecutive downlink subframes. The NPRS is also configured in the higher layer. The first subframe among NPRS consecutive subframes in which the PRS is transmitted is a subframe satisfying Equation 12.

$$\left(10 \times n_f + \left\lfloor \frac{n_s}{2} \right\rfloor - \Delta_{PRS}\right) \bmod T_{PRS} = 0 \quad \text{[Equation 12]}$$

Where, $n_f$ represents the SFN and $n_g$ represents the slot number.

That is, when the terminal receives the assistance data providing message, the terminal may find each PRS information by using the PRS configuration index of at least one cell included in the assistance data providing message.

Next, a method in which the terminal configures the measurement interval $T_{RSTD}$ for the RSTD by using the PRS transmission period in order to receive the signal from the base station and perform the measurement will be described.

When physical cell IDs of the neighboring cells and the OTDOA sub data are simultaneously provided, the terminal may receive the RSTD and perform the measurement. In the frequency band, n including the reference cell is at least 16 cells and the reference cell satisfies a condition within $T_{RSTD}$ ms given below.

$$T_{RSTD} = T_{TRS} \cdot (M-1) + \Delta_{ms}) \quad \text{[Equation 13]}$$

Where, $T_{RSTD}$ represents a total time required for search and measurement in at least n cells. $T_{TRS}$ represents a cell-specific location frame configuration period. M represents the number of PRS positioning occasions and $\Delta_{ms}$ as a measurement time for one PRS positioning occasion includes a sampling time and a processing time.

Table 7 shows organization of contents associated with M which is the number of positioning occasions.

TABLE 7

| Positioning subframe configuration period $T_{PRS}$ | Number of PRS positioning occasions M | |
|---|---|---|
| | f2 Note1 | f1 and f2 Note2 |
| 160 ms | 16 | 32 |
| >160 ms | 8 | 16 |

Note 1:
When inter-frequency RSTD measurements are performed over the reference cell and neighbour cells, which belong to the FDD inter-frequency carrier frequency f2.
Note 2:
When inter-frequency RSTD measurements are performed over the reference cell and the neighbour cells, which belong to the serving FDD carrier frequency f1 and the FDD inter-frequency carrier frequency f2 respectively.

When $T_{RSTD}$ is determined, the terminal may transmit the RSTD measured within $T_{RSTD}$ (S840). In this case, measured information is preferably transmitted after a $T_{RSTD}$ period elapsed in order to guarantee certainty. However, even before the $T_{RSTD}$ period elapsed, when the measured information satisfies a predetermined signal strength condition, and the like, information associated with the RSTD may be transmitted.

FIG. 11 is a diagram a process of transferring assistance data to a physical layer and configuring a measurement interval for an RSTD by using a PRS period.

Referring to FIG. 11, when the assistance data is received by the higher layer (1110), the physical layer receives the received assistance data (1120) and $T_{TRS}$ is determined as indicated by the assistance data (1130) and $T_{RSTD}$ is determined according to the determined $T_{TRS}$ (1140).

Accordingly, the PRS received from each cell is measured based on each $T_{RSTD}$ and the POA is calculated to report the RSTD value to the location server.

Meanwhile, RSTD measurement accuracy of the terminal for all measurement neighboring cells i needs to satisfy the following requirements. Hereinafter, the described requirements assume that the measurement report is not delayed by other LTE positioning protocol (LPP) through a dedicated control channel (DCCH).

In the case of an RSTD measurement reporting delay, delay uncertainty which occurs when the measurement report is inserted into a TTI of an uplink DCCH is not considered. Herein, the delay uncertainty is equal to 2×TTI-DCCH. Further, the measurement report delay does not include even any delay which may be caused because there is no uplink resource when the terminal transmits the measurement report.

The RSTD means the relative timing difference between the reference cell and the neighboring cell and is defined as shown in Equation 8 given below.

Table 8 is a table for describing the reference signal time difference (RSTD).

TABLE 8

| | |
|---|---|
| Definition | The RSTD means the relative timing difference between the neighbour cell j and the reference cell i, defined as $T_{SubframeRxj} - T_{SubframeRxi}$, where: $T_{SubframeRxj}$ is the time when the UE receives the start of one subframe from cell j and $T_{SubframeRxi}$ is the time when the UE receives the corresponding start of one subframe from cell i that is closest in time to the subframe received from cell j. The reference point for the observed subframe time difference shall be the antenna connector of the UE. |
| Application | RRC_CONNECTED intra-frequency<br>RRC_CONNECTED inter-frequency |

As described above, the reference cell and the neighboring cells may transmit the PRS at a similar time and when the reference cell and the neighboring cells transmit the PRS at the similar time, a difference between a time when the terminal receives the PRS from the reference cell and a time when the terminal receives the PRS from each of the plurality of neighboring cells are within a predetermined time range.

For example, the time between the time when the terminal receives the PRS from the reference cell and the time when the terminal receives the PRS from each of the plurality of neighboring cells may be within one subframe. Then, in defining the RSTD, when one subframe in which the terminal receives from the neighboring cell j is a first subframe of PRS positioning occasions of the neighboring cell j, one subframe received from the cell i closet to one subframe received from the cell j becomes a first subframe of the PRS positioning occasions of the reference cell i.

In this case, the PRS positioning occasions mean consecutive downlink subframes to which the PRS is allocated Accordingly, the RSTD becomes a difference between the time of receiving the PRS from the neighboring cell j and the time of receiving the PRS from the reference cell i.

CSI-RS

FIG. 12 is a view illustrating a periodic CSI-RS transmission method in a wireless communication system to which the present disclosure is applicable.

As illustrated in FIG. 12, in the case of an eNB transmitting a CSI-RS, a transmission cycle of the CSI-RS of the corresponding eNB is 10 (ms or subframes), and a CSI-RS transmission offset is 3 (subframes). In order to allow CSI-RSs of several cells to be evenly distributed in time, each eNB may have a different offset value. An eNB which transmits the CSI-RS at the cycle of 10 ms may have 10 offset values from 0 to 9. The offset values represent values of subframes in which the eNB having a specific period actually starts CSI-RS transmission. When the eNB provides information regarding the cycle and an offset value of the CSI-RS, a UE may measure the CSI-RS of the eNB in a corresponding position using the value and reports information such as a CQI/PMI/RI, or the like, to the eNB. The pieces of information related to the CSI-RS are all pieces of cell-specific information.

FIG. 13 is a view illustrating an aperiodic CSI-RS transmission method in a wireless communication system to which the present disclosure is applicable.

In FIG. 13, a method in which a CSI-RS is transmitted with a transmission subframe pattern is illustrated. The CSI-RS transmission pattern includes 10 subframes, and in each of the subframes, whether a CSI-RS is transmission is designated by 1-bit indicator.

In general, in order for the eNB to inform a UE about a CSI-RS configuration, the following two methods are considered.

System information broadcast in the LTE system may be divided into two types of information, that is, a master information block (MIB) transmitted in the PBCH and a system information block (SIB) transmitted in a PDSCH so as to be multiplexed with general unicast data and transmitted. In the LTE system, since information items transmitted in SIB type 1 to SIB type 8 (SIB 1 to SIB 8) have already been defined, a CSI-RS configuration is transmitted in SIB 9 and SIB 10 newly introduced in an LTE-A system.

Next, a second method using RRC signaling may be considered.

The second method is a method in which the eNB provides information regarding a CSI-RS configuration to each UE using dedicated RRC signaling. When a UE is connected to the eNB through initial accessing or handover, the eNB informs the corresponding UE about the CSI-RS configuration through RRC signaling. Or, the eNB informs the UE about the CSI-RS configuration through an RRC signaling message requesting a channel state feedback based on CSI-RS measurement.

A CSI-RS Config information element (IE) is used to specify the CSI-RS configuration.

Table 9 illustrates the CSI-RS-Config IE.

TABLE 9

```
-- ASN1START
CSI-RS-Config-r10 ::=          SEQUENCE {
    csi-RS-r10                    CHOICE {
        release                       NULL,
        setup                         SEQUENCE {
            antennaPortsCount-r10         ENUMERATED {an1, an2, an4, an8},
            resourceConfig-r10            INTEGER (0..31),
            subframeConfig-r10            INTEGER (0..154),
            p-C-r10                       INTEGER (-8..15)
        }
    }                                                                 OPTIONAL,
    -- Need ON
    zeroTxPowerCSI-RS-r10         CHOICE {
        release                       NULL,
        setup                         SEQUENCE {
            zeroTxPowerResourceConfigList-r10  BIT STRING (SIZE (16)),
            zeroTxPowerSubframeConfig-r10      INTEGER (0..154)
        }
    }                                                                 OPTIONAL
    -- Need ON
}
-- ASN1STOP
```

First, a first method of using dynamic BCH signaling may be considered.

The first method is a method for the eNB to broadcast information regarding a CSI-RS configuration to UEs. In the LTE system, when contents regarding system information, the corresponding information is transmitted in a broadcasting channel (BCH). Here, in a case in which the contents is too much to be transmitted in the BCH, the information is transmitted in the same manner as that of general data and a PDCCH of the corresponding data is transmitted by masking a CRC using a system information (SI)-RNTI, rather than a specific UE ID (e.g., a C-RNTI). Also, actual system information is transmitted in a PDSCH region like general unicast data. Then, every UE within a cell decodes the PDCCH using the SI-RNTI and subsequently decodes the PDSCH indicated by the corresponding PDCCH to obtain system information. This broadcasting method is also called a dynamic BCH (DBCH) distinguished from a physical BCH (PBCH), a general broadcasting method.

Referring to Table 9, an "antennaPortsCount" field indicates the number of antenna ports used for transmission of a CSI-RS. A resourceConfig" indicates a CSI-RS configuration. A "SubframeConfig" field and a "zeroTxPowerSubframeConfig" field indicates a subframe configuration ($I_{CSI-RS}$) in which a CSI-RS is transmitted.

A "zeroTxPowerResourceConfigList" field indicates a configuration of a zero-power (ZP) CSI-RS. A CSI-RS configuration corresponding to a bit set to 1 in a 16-bit bitmap forming the "zeroTxPowerResourceConfigList" field may be set to ZP CSI-RS.

A "p-C" field indicates a parameter ($p_C$) assumed by a ratio of a PDSCH energy per resource element (EPRE) and a CSI-RS EPRE.

The CSI-RS is transmitted through one, two, four, or eight antenna ports. Here, the used antenna ports are p=15, p=15,16, p=15, . . . , 18, and p=15, . . . , 22. The CSI-RS may be defined only for a subcarrier interval $\Delta f$=15 kHz.

A CSI-RS sequence may be generated using Equation 14 below.

$$r_{l,n_s}(m) = \frac{1}{\sqrt{2}}(1-2\cdot c(2m)) + j\frac{1}{\sqrt{2}}(1-2\cdot c(2m+1)), \quad \text{[Equation 14]}$$

$$m = 0, 1, \ldots, N_{RB}^{max,DL} - 1$$

Here, $r_{l,n_s}$ (denotes a CSI-RS sequence, c(i) denotes a pseudo-random sequence, denotes a slot number within a radio frame, l denotes an OFDM symbol number within a slot, and $N_{RB}^{maxDL}$ denotes a maximum RB number of a downlink bandwidth.

A pseudo-random sequence generator is initialized when each OFDM symbol starts as expressed by Equation 15 below.

$$c_{init} = 2^{10}\cdot(7\cdot(n_s+1)+l+1)\cdot(2\cdot N_{ID}^{cell}+1)+2\cdot N_{ID}^{cell}+N_{CP} \quad \text{[Equation 15]}$$

In Equation 15, $N_{ID}^{Cell}$ denotes a cell ID, and in the case of a general CP, $N_{CP}=1$, and in the case of an extended CP, $N_{CP}=0$.

Within a subframe set for CSI-RS transmission, a CSI-RS sequence) $r_{l,n_s}(m)$ generated through Equation 14 is mapped to a complex-varied modulation symbol $a_{k,l}^{(p)}$ used as a reference symbol of each antenna port (p) as expressed by Equation 16 below.

$$a_{k,l}^{(p)} = w_{l''}\cdot r_{l,n_s}(m') \quad \text{[Equation 16]}$$

$$k = k' + 12\,m + \begin{cases} -0 & \text{for } p \in \{15, 16\}, \text{ normal cyclic prefix} \\ -6 & \text{for } p \in \{17, 18\}, \text{ normal cyclic prefix} \\ -1 & \text{for } p \in \{19, 20\}, \text{ normal cyclic prefix} \\ -7 & \text{for } p \in \{21, 22\}, \text{ normal cyclic prefix} \\ -0 & \text{for } p \in \{15, 16\}, \text{ extended cyclic prefix} \\ -3 & \text{for } p \in \{17, 18\}, \text{ extended cyclic prefix} \\ -6 & \text{for } p \in \{19, 20\}, \text{ extended cyclic prefix} \\ -9 & \text{for } p \in \{21, 22\}, \text{ extended cyclic prefix} \end{cases}$$

$$l = l' + \begin{cases} l'' & \text{CSI reference signal configurations 0-19, normal cyclic prefix} \\ 2l'' & \text{CSI reference signal configurations 20-31, normal cyclic prefix} \\ l'' & \text{CSI reference signal configurations 0-27, extended cyclic prefix} \end{cases}$$

$$w_{l''} = \begin{cases} 1 & p \in \{15, 17, 19, 21\} \\ (-1)^{l''} & p \in \{16, 18, 20, 22\} \end{cases}$$

$$l'' = 0, 1$$

$$m = 0, 1, \ldots, N_{RB}^{DL} - 1$$

$$m' = m + \left\lfloor \frac{N_{RB}^{max,DL} - N_{RB}^{DL}}{2} \right\rfloor$$

In Equation 16, conditions for (k',l') (Here, k' denotes a subcarrier index within a resource block and l' denotes an OFDM symbol index within a slot) and $n_s$ are determined according to CSI-RS configurations illustrated in Table 10 or Table 11 below.

Table 10 illustrates mapping of (k',l') from the CSI-RS configurations in a general CP.

TABLE 10

| CSI reference signal configuration | Number of CSI reference signals configured | | | | | |
|---|---|---|---|---|---|---|
| | 1 or 2 | | 4 | | 8 | |
| | (k', l') | $n_s$ mod 2 | (k', l') | $n_s$ mod 2 | (k', l') | $n_s$ mod 2 |
| 0 | (9, 5) | 0 | (9, 5) | 0 | (9, 5) | 0 |
| 1 | (11, 2) | 1 | (11, 2) | 1 | (11, 2) | 1 |
| 2 | (9, 2) | 1 | (9, 2) | 1 | (9, 2) | 1 |
| 3 | (7, 2) | 1 | (7, 2) | 1 | (7, 2) | 1 |
| 4 | (9, 5) | 1 | (9, 5) | 1 | (9, 5) | 1 |
| 5 | (8, 5) | 0 | (8, 5) | 0 | | |
| 6 | (10, 2) | 1 | (10, 2) | 1 | | |
| ... | | | | | | |
| 18 | (3, 5) | 1 | | | | |
| 19 | (2, 5) | 1 | | | | |
| 20 | (11, 1) | 1 | (11, 1) | 1 | (11, 1) | 1 |
| 21 | (9, 1) | 1 | (9, 1) | 1 | (9, 1) | 1 |
| 22 | (7, 1) | 1 | (7, 1) | 1 | (7, 1) | 1 |
| 23 | (10, 1) | 1 | (10, 1) | 1 | | |
| ... | | | | | | |
| 29 | (2, 1) | 1 | | | | |
| 30 | (1, 1) | 1 | | | | |
| 31 | (0, 1) | 1 | | | | |

Table 11 illustrates mapping of (k',l') from CSI-RS configurations in an extended CP.

TABLE 11

| CSI reference signal configuration | Number of CSI reference signals configured | | | | | |
|---|---|---|---|---|---|---|
| | 1 or 2 | | 4 | | 8 | |
| | (k', l') | $n_s$ mod 2 | (k', l') | $n_s$ mod 2 | (k', l') | $n_s$ mod 2 |
| 0 | (11, 4) | 0 | (11, 4) | 0 | (11, 4) | 0 |
| 1 | (9, 4) | 0 | (9, 4) | 0 | (9, 4) | 0 |
| 2 | (10, 4) | 1 | (10, 4) | 1 | (10, 4) | 1 |
| 3 | (9, 4) | 1 | (9, 4) | 1 | (9, 4) | 1 |
| 4 | (5, 4) | 0 | (5, 4) | 0 | | |
| 5 | (3, 4) | 0 | (3, 4) | 0 | | |
| 6 | (4, 4) | 1 | (4, 4) | 1 | | |
| 7 | (3, 4) | 1 | (3, 4) | 1 | | |
| 8 | (8, 4) | 0 | | | | |
| ... | | | | | | |
| 17 | (10, 1) | 1 | (10, 1) | 1 | (10, 1) | 1 |
| 18 | (9, 1) | 1 | (9, 1) | 1 | (9, 1) | 1 |
| 19 | (5, 1) | 1 | (5, 1) | 1 | | |
| 20 | (4, 1) | 1 | (4, 1) | 1 | | |
| ... | | | | | | |
| 25 | (2, 1) | 1 | | | | |
| 26 | (1, 1) | 1 | | | | |
| 27 | (0, 1) | 1 | | | | |

Referring to Table 10 and Table 11, in the CSI-RS transmission, a maximum of 32 (in the case of a general CP) or a maximum of 28 (in the case of an extended CP) different configurations are defined in order to reduce inter-cell interference (ICI) in a multi-cell environment including a heterogeneous network (HetNet) environment.

The CSI-RS configurations are different according to the number of antenna ports of a cell and a CP, and adjacent cells may have different configurations as many as possible. Also, the CSI-RS configurations may be divided into a case in which the CSI-RS configurations are applied to both an FDD frame and a TDD frame and a case in which the CSI-RS configurations are applied only to the TDD frame.

On the basis of Table 10 and Table 11, (k',l') and $n_s$ are defined according to CSI-RS configurations, and when this is applied to Equation 16, time and frequency resources in which each CSI-RS antenna port is used in CSI-RS transmission are determined.

FIG. 14 is a view illustrating a CSI-RS configuration in a wireless communication system to which the present disclosure is applicable.

In particular, FIG. 14 illustrates CSI-RS configurations (i.e., the case of a general CP) according to Equation 16 and Table 10.

FIG. 14(a) illustrates twenty CSI-RS configurations that may be used for CSI-RS transmission by one or two CSI-RS antenna ports, FIG. 14(b) illustrates ten CSI-RS configurations that may be used by four CSI-RS antenna ports, and FIG. 14(c) illustrates five CSI-RS configurations that may be used for CSI-RS transmission by eight CSI-RS antenna ports.

In this manner, a radio resource (i.e., an RE pair) in which the CSI-RS is transmitted is determined according to each CSI-RS configuration.

When one or two antenna ports are set for CSI-RS transmission regarding a specific cell, a CSI-RS is transmitted in a radio resource according to a set CSI-RS configuration among the twenty CSI-RS configurations illustrated in FIG. 14(a).

Similarly, when four antenna ports are set for CSI-RS transmission regarding a specific cell, a CSI-RS is transmitted in a radio resource according to a set CSI-RS configuration among the ten CSI-RS configurations illustrated in FIG. 14(b). Also, when eight antenna ports are set for CSI-RS transmission regarding a specific cell, a CSI-RS is transmitted in a radio resource in accordance with a set CSI-RS configuration among five CSI-RS configurations illustrated in FIG. 14(c).

A CSI-RS regarding each antenna port is CDM-ed to the same radio resource by two antenna ports (i.e., {15,16}, {17,18}, {19,20}, {21,22}) so as to be transmitted.

For example, regarding the antenna ports 15 and 16, a CSI-RS complex symbol of each of the antenna ports 15 and 16 is the same but multiplied by different orthogonal codes (e.g., Walsh codes) so as to be mapped to the same radio resource. [1 1] is multiplied to a complex symbol of the CSI-RS regarding the antenna port 15 and [1 −1] is multiplied to a complex symbol of the CSI-RS regarding the antenna port 16 so as to be mapped to the same radio resource. This is no different for the antenna ports {17,18}, {19,20}, and {21,22}.

The UE may detect a CSI-RS regarding a specific antenna by multiplying a multiplied code to a transmitted symbol. That is, in order to detect a CSI-RS regarding the antenna port 15, the UE multiplies the multiplied code [1, 1] and, in order to detect a CSI-RS regarding the antenna port 16, the UE multiplies the multiplied code [1 −1].

Referring to FIGS. 14(a) to 14(c), when corresponding to the same CSI-RS configuration index, a radio resource in accordance with a CSI-RS configuration with a large number of antenna ports includes a radio resource in accordance with a CSI-RS with a small number of antenna ports. For example, in the case of a CSI-RS configuration 0, a radio resource regarding eight antenna ports includes a radio resource regarding four antenna ports and a radio resource regarding one or two antenna ports.

In a cell, a plurality of CSI-RS configurations may be used. A non-zero power (NZP) CSI-RS may use only zero or one CSI-RS configuration, and a zero power (ZP) CSI-RS may use zero or several CSI-RS configurations.

By each bit set to 1 in a ZP CSI-RS, 16-bit bitmap set by a higher layer, a UE assumes zero transmission power in REs corresponding four CSI-RS columns (excluding a case of being repeated with an RE assuming an NZP CSI-RS set by a higher layer) in Table 3 and Table 4. The most significant bit (MSB) corresponds to a lowest CSI-RS configuration index, and a following bit within a bitmap corresponds to a following CSI-RS configuration index in order.

A CSI-RS is transmitted only in a downlink slot and a CSI-RS subframe configuration satisfying the condition of n mod 2 in Table 10 and Table 11 above.

In the case of a frame structure type 2 (TDD), a CSI-RS is not transmitted in a special subframe, a subframe that collides with a synchronization signal (SS), a PBCH, or a system information block type (SIB) 1 message transmission, or a subframe set for a paging message transmission.

Also, an RE in which a CSI-RS regarding any antenna port belonging to an antenna port set S (S={15}, S={15,16}, S={17,18}, S={19,20} 또는 S={21,22}) is transmitted is not used in a CSI-RS transmission of a PDSCH or another antenna port.

Since time-frequency resources used in CSI-RS transmission cannot be used in data transmission, data throughput is reduced as CSI-RS overhead is increased. In consideration of this, a CSI-RS is configured not to be transmitted in every subframe but transmitted in every predetermined transmission period corresponding to a plurality of subframes. Here, CSI-RS transmission overhead may be significantly lowered, compare with a case in which the CSI-RS is transmitted in every subframe.

A subframe period for CSI-RS transmission (hereinafter, referred to as "CSI periodicity") ($T_{CSI-RS}$) and a subframe offset ($\Delta_{CSI-RS}$) are shown in Table 12 below.

Table 12 illustrates a CSI-RS subframe configuration.

TABLE 12

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
|---|---|---|
| 0-4 | 5 | $I_{CSI-RS}$ |
| 5-14 | 10 | $I_{CSI-RS}$ − 5 |
| 15-34 | 20 | $I_{CSI-RS}$ − 15 |
| 35-74 | 40 | $I_{CSI-RS}$ − 35 |
| 75-154 | 80 | $I_{CSI-RS}$ − 75 |

Referring to Table 12, a CSI-RS periodicity ($T_{CSI-RS}$) and a subframe offset ($\Delta_{CSI-RS}$) are determined according to CSI-RS subframe configuration ($I_{CSI-RS}$).

The CSI-RS subframe configuration of Table 12 may be set to any one of a "SubframeConfig" field and a "zeroTx-PowerSubframeConfig" field. The CSI-RS subframe configuration may be separately set for a NZP CRI-RS and a ZP-CSI-RS.

A subframe including a CSI-RS satisfies Equation 17 below.

$$(10n_f \lfloor n_s/2 \rfloor - \Delta_{CSI-RS}) \bmod T_{CSI-RS} = 0 \quad \text{[Equation 17]}$$

In Equation 17, $T_{CSI-RS}$ denotes a CSI-RS periodicity, $\Delta_{CSI-RS}$ denotes a subframe offset value, $n_f$ denotes a system frame number, and $n_s$ denotes a slot number.

In the case of a UE in which a transmission mode 9 is set for a serving cell, one CSI-RS resource configuration may be set in the UE. In the case of a UE in which a transmission mode 10 is set for a serving cell, one or more CSI-RS resource configuration(s) may be set in the UE.

Parameters are set for each of the CSI-RS resource configuration through higher layer signaling as follows.

CSI-RS resource configuration identity, when a transmission mode 10 is set
  CSI-RS port number
  CSI-RS configuration (Please refer to Table 10 and Table 11)
  CSI-RS subframe configuration ($I_{CSI\text{-}RS}$) (Please refer to Table 12)
  Transmission power ($P_c$) when a transmission mode 9 is set
  Transmission power ($P_c$) for CSI feedback with respect to each CSI process when the transmission mode 10 is set. When CSI subframe sets $C_{CSI,0}$ and $C_{CSI,1}$ are set by a higher layer with respect to a CSI process, $P_c$ is set for each of CSI subframe sets of the CSI process.
  Pseudo-random sequence generator parameter ($n_{ID}$)
  Higher layer parameter ('O-CRS-Info-r11') including QuasiCo-located (QCL) scrambling identity (qcl-ScramblingIdentity-r11) for a QCL type B UE assumption, a CRS port count (crs-PortsCount-r11), and MBSFN subframe configuration list (mbsfn-SubframeConfigList-r11) parameter, when the transmission mode 10 is set.

When a CSI feedback value derived by a UE has a value with a [−8, 15] dB range, $P_c$ is assumed as a ratio of PDSCH EPRE to a CSI-RS EPRE. Here, the PDSCH EPRE corresponds to a symbol in which a ratio there of to the CRS EPRE is $\rho_A$.

In the same subframe of a serving cell, a CSI-RS and a PMCH are not set together.

In a case in which four CRS antenna ports are set in a frame structure type 2, a CSI-RS configuration index that belongs to a [20-31] set (please refer to Table 10) in the case of a general CP or a [16-27] set (please refer to Table 11) in the case of an extended CP is not set in a UE.

In a UE, it may be assumed that a CSI-RS antenna port of a CSI-RS resource configuration has a QCL relationship with respect to delay spread, Doppler spread, Doppler shift, average gain, and average delay.

In a UE in which the transmission mode 10 and the QCL type B are set, it may be assumed that antenna ports 0-3 corresponding to a CSI-RS configuration and antenna ports 15-22 corresponding to a CSI-RS resource configuration have a QCL relationship with respect to Doppler spread and Doppler shift.

In the case of a UE in which the transmission mode 10 is set, one or more channel-state information-interference measurement (CSI-IM) resource configurations.

Following parameters for each of CSI-IM resource configurations may be set through higher layer signaling.

ZP CSI-RS configuration (please refer to Table 10 and Table 11)
  ZP CSI RS subframe configuration ($I_{CSI\text{-}RS}$) (please refer to Table 12)

The CSI-IM resource configuration is the same as any one of set ZP CSI-RS resource configurations.

In the same subframe of a serving cell, a CSI-IM resource and a PMCH are not simultaneously set.

In the case of a UE in which the transmission modes 1-9 are set, one ZP CSI-RS resource configuration may be set in the UE with respect to a serving cell. In the case of a UE in which the transmission mode 10 is set, one or more ZP CSI-RS resource configurations may be set with respect to a serving cell.

The following parameters for a ZP CSI-RS resource configuration may be set through higher layer signaling.

ZP CSI-RS configuration list (please refer to Table 10 and Table 11)
  ZP CSI-RS subframe configuration ($I_{CSI\text{-}RS}$) (please refer to Table 12)

A ZP CSI-RS and a PMCH are not simultaneously set in the same subframe of a serving cell.

Hereinafter, a method for estimating a location of a terminal by defining a reference signal (RS) or a pilot signal in a novel form proposed in this disclosure will be described in detail.

The name of a base station used hereinafter may also be referred to as remote radio head (RRH), eNB, transmission point (TP), reception point (RP), relay, and the like.

In general, in a cellular communication system, various methods are used for a network to obtain location information of a terminal.

Typically, in an LTE(-A) system, a location of a terminal is estimated through an observed time difference of arrival (OTDOA) method using a positioning reference signal (PRS).

The PRS may also be termed a location determining reference signal.

In detail, the terminal may receive PRS transmission setting information related to a PRS transmission of a BS from a higher layer signal, measure PRSs transmitted from neighbor cells to calculate location-related information of the terminal through a positioning method such as OTDOA, or the like, and transmits the calculated location-related information to the network.

Other terminal location estimation methods include various methods such as an assisted global navigation satellite system (A-GNSS) positioning technique, an enhanced cell-ID (E-CID) technique, uplink time difference of arrival (UTDOA), and the like.

Location information of the terminal measured through the aforementioned positioning method may be utilized in various location-based services (e.g., advertisement, location tracking, a communication unit for emergency, and the like).

As discussed above, the related art positioning methods are supported by 3GPP UTRA and E-UTRA standard (e.g., LTE Rel-9), but recently, in particular, an enhanced positioning technique with high accuracy is requested for in-building positioning.

That is, although the related art positioning methods are techniques commonly applicable to outdoor/indoor environment, general positioning accuracy of an E-CID method, for example, is known to be about 150 m in an NLOS environment and 50 ms in an LoS environment.

Also, the OTDOA method based on a PRS has limitations in that a positioning error may exceed 100 meters due to a synchronization error of a BS, an error based on multipath propagation, an RSTD measurement quantization error of a UE, a timing offset estimation error, and the like.

Also, the A-GNSS method has a breaking point in complexity, battery consumption, and the like, due to the necessity of a GNSS receiver, it has limitations in being utilized in in-building positioning.

Thus, this disclosure provides a method in which, basically, a cellular network transmits a specific pilot signal (or a specific RS) to a UE, the UE measures the received specific pilot signal to calculate a positioning-related estimation value through a specific positioning method and reports the calculated estimation value to the BS, thereby calculating location information of the UE in the network.

The specific pilot signal or the specific RS refers to a new location estimation-related reference signal proposed in this disclosure and may be in the form of a reference signal identifiable by each BS or each transmission point (TP).

The positioning-related estimation value based on the specific positioning technique may be, for example, an estimation value through OTDOA, RSTD method, and the like.

According to a current 3GPP standard, a CRS or a PRS is typically used as the location estimation-related reference signal RS.

For example, when PRS-related information is included as information regarding a specific cell indicated by the OTDOA-ReferenceCellInfo or OTDOA-NeighbourCellInfoElement, a UE may measure a PRS to calculate the aforementioned positioning-related estimation value, and report the same to a BS.

If PRS-related information is not included in the specific cell in the OTDOA-ReferenceCellInfo or OTDOA-NeighbourCellInfoElement, the UE may measure a CRS of the specific cell to calculate a positioning-related estimation value and report the same to the BS.

Discover Signal-Based Measurement Method

For the purposes of description, first, a discovery signal-based measurement method will be briefly described and a discovery signal-based positioning performing method proposed in this disclosure will then be described in detail.

In order to accommodate data explosively increasing data traffic, a small cell enhancement technology regarding a small cell for covering a relatively small area using power less than that of an existing macro cell has been actively conducted.

Small cell enhancement refers to a technology of densely disposing small cells within macro cell coverage (or without macro cell coverage in the case of the inside of a building, or the like) and dramatically increasing spectrum efficiency per unit area through close cooperation between a macro cell eNB and a small cell eNB or between small cell eNBs to enable effective mobility management, while accommodating explosively increasing traffic. In particular, in a specific area such as a so-called hot spot within a cell, a particularly large communication demand occurs and reception sensitivity of propagation may be degraded in a specific area such as a cell edge or a coverage hole, and thus, a small cell may be used in a communication shadow area not covered by a macro cell or in an area in which many data service requests are made such as a hot spot.

A macro cell eNB may also be referred to as a macro eNB (MeNB), and a small cell eNB may also be referred to as a small eNB or a secondary eNB (SeNB).

In order to energy saving of a small cell and reduce interference to an adjacent cell, the small cell enhancement supports a small cell ON/OFF mechanism maintaining an ON state of a small cell only when a UE is present within small cell coverage, and maintaining an OFF state of the small cell in an otherwise case.

UE mobility management (e.g., handover, etc.) is performed on the basis of a frequency of a macro cell (e.g., a (component) carrier, cell frequency band), and thus, even though a portion of a small cell is in an OFF state, connection of a UE to a network is not completely cut off.

A discovery procedure allowing a user to determine an ON/OFF state of a small cell is required.

To this end, it is defined such that a small cell always transmits (i.e., broadcasts) a discovery signal (or a discovery reference signal (DRS)), regardless of ON/OFF state.

Hereinafter, in the present disclosure, the "discovery signal" will be simply referred to as a "DRS".

In other words, even when the small cell is in the OFF state, the small cell broadcasts or transmits a DRS at a predetermined period.

Here, the predetermined period may be referred to as a DRS measurement period or a DRS measurement timing configuration (DMTC).

The DMTC period may be 40 ms, 80 ms, 160 ms, and the like.

The DMTC includes a DMTC period and a DMTC offset.

The DMTC period T refers to the aforementioned predetermined period or a DRS measurement period.

Also, the DMTC duration may be interpreted as indicating a duration corresponding to one DMTC period.

The DMTC offset is information denoting a point at which the DMTC period starts and may, for example denote an offset value to a subframe at which a DMTC starts after a starting point of a frame in which a system frame number (SFM) is 0.

The DMTC offset value is defied within the number of subframes, and may have values from 0 to T-1 ms. Here, T denotes the aforementioned DMTC period.

For example, when T is 40 (T=40), the DMTC offset value may have values from 0 to 39.

Also, the DMTC duration may include at least one DMTC occasion.

Or, the at least one DMTC occasion is included in the DMTC period.

The DMTC occasion denotes information related to a time point at which a DRS is transmitted from a specific cell, and a duration of the DMTC occasion is fixed to 6 ms.

The DMTC occasion may also be expressed as a DRS occasion.

That is, the DMTC occasion may include contiguous subframe durations (e.g., one (or two) to five contiguous subframe durations), and one DMTC occasion may be present once in every DMTC period.

That is, one cell sets one DMTC occasion within every DMTC period. However, when a plurality of cells are preset, a plurality of different DMTC occasions may be set within every DMTC period.

Also, the plurality of different DMTC occasions may have different durations of the DMTC occasions.

A duration of the DMTC occasion denotes a measurement duration, a measurement window, or a DRS search window in which a UE actually measures a DRS.

In a duration of the DMTC occasion, a synchronization signal (SS), a DRS, and the like, may be transmitted to a UE.

Here, a small cell may maintain an ON state in which a DRS is broadcast for a predetermined time (e.g., one to five subframes). For example, in a case in which the DMTC period is 40 ms, the small cell may broadcast a DRS, while maintaining ON state during 6 ms, and maintain an OFF state during the other remaining 34 ms.

Here, 6 ms during which the DRS is broadcast may refer to a duration of the aforementioned DMTC occasion.

Types of the DRS may include a PSS/SSS, a CRS, a CSI-RS, and the like.

The UE performs measurement on the basis of the DRS received from the small cell, and transmits a measurement report to the BS (or the network). In this manner, since the DRS transmitted from a small cell is measured by the UE and reported to the BS (or the network), regardless of whether the small is in an ON/OFF state, the BS (or the network) may recognize a small cell with best efficiency around the corresponding UE. For example, upon receiving a measurement result from the UE, when DRS reception power in a small cell in an OFF state or the UE is strong, the BS (or the network) may switch the corresponding small cell to an ON state.

A DMTC of the UE may be set by frequency bands from a higher layer signal.

In this manner, a plurality of (small) cells may have cell-specific DRS occasion configuration in a corresponding frequency band in every DMTC occasion duration of 6 ms.

Here, only a duration of the DMTC occasion of the corresponding cell may be separately set as one of {1, 2, 3, 4, and 5} and provided to the UE.

In the case of FDD, a duration of the DMTC occasion may be set to any one of {1, 2, 3, 4, and 5} ms.

In the case of TDD, a duration of the DMTC occasion may be set to any one of {2, 3, 4, and 5} ms.

Here, within the duration of the DMTC occasion, an SSS may be defined to be transmitted always in a first subframe.

Thus, the UE may assume that the SSS is always received in the first subframe of a specific DMTC occasion duration.

Thus, the UE may recognize that the first subframe of the DMTC occasion duration is always a non-MBSFN subframe.

Thus, the UE may detect or measure a CRS by recognizing the number of CRS REs in the corresponding subframe.

Here, a DRS-CSI-RS may be separately set from a DMTC and provided to the UE.

That is, the DRS-CSI-RS may be provided as relative subframe offset information within the DMTC (or as subframe offset information relative to a transmission subframe of an SSS within the DMTC occasion) to the UE.

Thus, the UE may recognize a time point of a transmission subframe of a specific DRS-CSI-RS, and may measure the DRS-CSI-RS using the same.

In addition, a resource element (RE) position information regarding the DRS-CSI-RS, sequence scrambling-related information, an associated physical cell ID information, and the like, may be provided to the UE through a separate setting.

Hereinafter, a method for performing discovery reference signal (DRS)-based positioning-related measurement and measurement report proposed in this disclosure will be described.

FIGS. 15 to 17 are views illustrating an example of small cell scenarios to which methods proposed in this disclosure is applicable.

As illustrated in FIG. 15, it can be seen that, when coverage of a macro-cell is present in a specific frequency F1, small cells corresponding to nodes having relatively low power form a cluster so as to be present in coverage of the macro-cell.

FIG. 16 illustrates a case in which the small cells illustrated in FIG. 15 are disposed in the same frequency F1 as that of the macro-cell, and an environment such as that of FIG. 16 will be referred to as a small cell scenario #1 for the purposes of description That is, the small cell scenario #1 denotes an environment in which small cells have the same frequency as that of the macro-cell and form a cluster so as to be disposed within coverage of the macro-cell.

As illustrated in FIG. 16, the small cell scenario of FIG. 16 is different from the related art CoMP scenarios in the following aspects.

Cells are connected by non-ideal backhaul
Small cells may be disposed more densely within coverage of the macro-cell FIG. 17 illustrates an environment in which small cells are disposed in a frequency F2 different from that of the macro-cell, and the small cell scenario of FIG. 17 will be referred to as a small cell scenario #2 (#2a or #2b) for the purposes of description.

FIG. 17A, i.e., the small cell scenario #2a, illustrates a small cell environment in which small cells are positioned in outdoor area, and FIG. 17B, i.e., the small cell scenario #2b, illustrates an environment in which small cells are positioned in an indoor area Here, it is assumed that F2 (e.g., 3.5 GHz) is a frequency band higher than that of F1 (2 GHz).

Also, in the drawing, the small scenario #3 is not illustrated but may be specified as an environment forming "small cell clusters without macro coverage".

That is, the small cell scenario #3 may be considered as a small cell scenario increasing efficiency of a frequency through cluster between small cells in an environment without coverage of a macro-cell.

Hereinafter, measurement/measurement report of a DRS-based positioning-related terminal proposed in this disclosure will be described using the small cell scenario #2 of FIG. 17 in which the macro-cell operates in a frequency band of F1 (e.g., 2 GHz) and small cells operate in a frequency band of F2 (e.g., 3.5 GHz), as an example.

That is, in the method described hereinafter, the macro-cell transmits a PRS in the frequency F1 (low frequency) and the UE performs coarse positioning estimation on the basis thereof.

Also, each small cell periodically transmits a DRS always according to (a DMTC, a DRS occasion, and the like) regardless of an ON or OFF operation in the frequency F2, and the terminal performs fine positioning tracking on the basis thereof.

That is, each small cell periodically transmits the DRS for the purpose of discovery, even without transmission of a separate PRS in the frequency F2 through the defined method to support the UE to perform a positioning-related operation, thereby reducing network overhead.

Also, in a case in which measurement of the UE is performed using the DRS-CSI-RS as the DRS, since the DRS-CSI-RS may be set to be transmitted to a resource muted by adjacent cells (or TPs) (e.g., through zero-power CSI-RS configuration), a measurement value of the UE regarding the DRS-CSI-RS is obtained in a higher SINR environment, increasing measurement accuracy regarding the measurement of the UE.

The method proposed in this disclosure described on the basis of the small cell scenario of FIG. 17 as an example may also be applied to the small cell scenario #1 (F1=F2) of FIG. 16, or the like.

However, in the small cell scenario #1 (frequency F1=frequency F2) of FIG. 16, transmission resources between the PRS transmitted by the macro cells and DRS transmitted by the small cells may overlap (or collide with each other).

In this case, a collision handling issue regarding how to prevent occurrence of a collision between RSs by providing priority to which of RSs is required to be considered additionally.

That is, the method described in this disclosure may be generally applied to (small) cells transmitting a discovery signal, excluding additional issues that may occur by specific scenarios.

Hereinafter, a DRS-based positioning performing method proposed in this disclosure will be described in more detail on the basis of the small cell scenario #2 of FIG. 17 as an example.

First, the DRS-based positioning performing method proposed in this disclosure may include (1) PRS-based coarse positioning method and (2) DRS-based fine positioning method.

The PRS-based coarse positioning method of (a) is a method of performing measurement and measurement report of a UE using a coarse PRS transmitted by a macro cell in a low frequency, and the DRS-based fine positioning method of (2) is a method of performing measurement and measurement of report of a UE using a fine DRS transmitted by a small cell in a frequency higher than the frequency of (1).

First, the coarse positioning performing method using a PRS of (1) will be described in detail.

Referring to the small cell scenario #2 of FIG. 17, for example, the operation of (1) is defined or configured to be performed only for the frequency F1.

That is, macro-cells transmit a PRS in the frequency F1.

Accordingly, the UE reports a reception timing difference information (e.g., RSTD) between a PRS transmitted by a specific set reference cell and a PRS transmitted by a different neighbor cell to a BS.

Accordingly, the network performs coarse positioning estimation of the UE using an OTDOA technique, or the like.

In order to support the method of (1), assistance information provided by a (serving) BS to the UE may include information included in Table 2 in the same manner.

That is, the BS transmits OTDOA-ReferenceCellInfo OTDOA-NeighbourCellInfoElement information to the UE, and the UE performs PRS-based measurement on the basis thereof and reports the same to the BS.

The PRS-based positioning performing method may be referred to the contents described above.

Hereinafter, the DRS-based fine positioning performing method of (2) will be described in detail.

Referring to the small cell scenario #2 of FIG. 17, for example, the operation of (2) may be defined or configured to be performed only for the frequency F2.

In this case, unlike (1), assistance information for DRS-based positioning-related measurement should be newly defined in the frequency F2, and provided to a UE through a separate method.

The assistance information newly defined for the operation of (2), may include 1) DMTC (configuration) information of each frequency, 2) DRS-Info IE including DRS-related detailed information, and 3) detailed information related to measurement report of the UE.

The detailed information 1) and 2) included in the newly defined assistance information will be described in more detail.

DMTC (DRS Measurement Timing Configuration) Information

When the DMTC is provided to the UE through a higher layer signal for the purpose of positioning, OTDOA-NeighbourCellInfoElement included in the newly defined assistance information for the positioning may include DMTC (configuration) information as common information regarding a specific frequency, instead of including physCellId (and/or cellGlobalId) information, unlike an existing message format of OTDOA-NeighbourCellInfoElement.

That is, the existing assistance information explicitly indicates individual physCellId and cellGlobalId and also explicitly indicates information regarding a PRS sequence transmitted from a corresponding cell through the assistance information.

In contrast, the assistance information proposed in this disclosure newly defined for positioning does not include physCellId (and/or cellGlobalId).

Instead, the UE is defined to blind-detect a DRS transmitted by a specific cell within a DMTC duration using DMTC information included in the assistance information.

Here, the blind detection may also be expressed as blind decoding.

When the network transmits information related to DRS detection to the UE in advance, the UE may perform a DRS or perform measurement.

That is, when the UE detects a DRS transmitted by a specific cell (or TP) in a corresponding frequency through blind detection, the UE regards the detected DRS as a neighbor cell (or a neighbor TP).

Thus, the UE measures a time of arrival thereof and reports TOA difference information with a specific (or predefined) reference cell (or a reference TP) to the BS.

In this manner, when the UE performs (RSTD) report to the BS, the UE may report identification information (e.g., a detected cell ID, a specific scrambling ID, a related PCID (when present) and/or separate previously defined TP-ID, etc.) of the corresponding neighbor cell/TP together with the calculated (RSTD) value to the BS.

Also, the UE may be defined (or configured) to transmit identification information of the specific (or predefined) ReferenceCell/TP which was applied for the calculation), together when reporting.

Here, in order for the identification information of the specific ReferenceCell/TP to be transmitted together when the UE performs report to the BS, the ReferenceCell/TP information may be explicitly indicated and transmitted to the UE together through a higher layer signal when the DMTC information is transmitted to the UE.

For example, regarding a specific frequency (e.g., frequency F2), (one) ReferenceCell/TP information may be provided together with the DMTC (configuration) information from a higher layer.

In this case, on the basis of a TOA estimated from a specific RS (which may follow a setting such as a PRS, a CSI-RS, a DRS, etc, for example) transmitted by the set ReferenceCell/TP, the UE reports difference information of the TOA obtained by measuring the DRS transmitted from the cell/TP detected on the basis of the DMTC configuration information to the BS.

The difference information of the TOA obtained by the UE on the basis of the DMTC (configuration) information may be information indicating a degree to which mismatch of an estimated subframe boundary of each cell/TP is generated.

In other words, a start point of the subframe regarding a subframe boundary estimated through a specific RS transmitted by the ReferenceCell/TP may be considered as the TOA estimated from the reference Cell/TP.

Also, a start point of a subframe regarding a subframe boundary estimated through a DRS transmitted by the cell/TP detected on the basis of the DMTC configuration information may be considered as a TOA estimated from the detected Cell/TP.

Thus, the UE may report the difference information (RSTD) between the TOA estimated from the reference cell/TP and the TOA estimated from the detected cell/TP to the BS.

In a case in which the UE receives a plurality of pieces of ReferenceCell/TP information together with the DMTC configuration information from a higher layer, when the UE reports a specific RSTD to the BS, the UE may transmit identification information of a certain ReferenceCell/TP together with the RSTD report to the BS in order to specify the certain ReferenceCell/TP the RSTD report is based on.

A DMTC duration is fixed to 6 ms, or the like, in every DMTC period.

However, the DMTC duration may not be fixed to 6 ms, or the like, but may be set to a configurable value, and a method providing this value to the UE may also be possible.

As discussed above, preferably, only one DMTC (configuration) information is limitedly provided to the UE by frequencies.

However, it is also possible to provide a plurality of pieces of DMTC configuration information to the UE by frequencies in terms of flexibility.

In this case, the aforementioned contents may be independently provided or applied by each DMTC information.

Or, specific DMTC information may be defined to be commonly applied to a plurality of frequencies.

In this case, it may be defined such that the UE performs inter-frequency measurement in one DMTC.

Preferably, one DMTC configuration information may be set per frequency, and in a case in which there is a section in which DMTC duration set for each of two or more frequencies overlaps, the UE may be defined to perform inter-frequency measurement in the overlapping section.

The DMTC configuration information, DMTC information, and DMTC used in this disclosure may be interpreted as having the same meaning.

That is, the DMTC configuration information, DMTC information, and DMTC refer to information related to time for measuring a DRS periodically broadcast by a small cell.

DRS-Info IE (Information Element) Including DRS-Related Detailed Information

A DRS-Info IE may be defined for performing DRS-based positioning, and the DRS-Info IE may include DRS-related detailed information by DMTCs.

That is, the DRS-related detailed information may be DMTC occasion, a PCID for CRS-based DRS measurement, a DRS-CSI-RS configuration information, ZP-CSI-RS configuration information for rate matching in relation to DRS, and the like.

Hereinafter, the DRS-related detailed information will be described in detail.

DMTC Occasion

The DRS-Info IE may include information related to DMTC occasion. The DMTC occasion may be explicitly indicated by DMTCs.

Also, the DRS-Info IE may additionally include subframe information such as DRS-PSS/SSS, DRS-CRS, and the like, transmitted by a specific cell.

As discussed above, the DRS-Info IE may include any one of {1, 2, 3, 4, 5, ...} ms as the DMTC occasion duration of a specific cell.

In the case of FDD, a duration of the DMTC occasion may be set to any one of {1, 2, 3, 4, and 5} ms.

In the case of TDD, a duration of the DMTC occasion may be set to any one of {2, 3, 4, and 5} ms.

In this manner, when the DMTC occasion duration is included in the DRS-Info IE and transmitted to the UE, blind detection candidates of the UE may be explicitly indicated.

In this manner, the UE may have an effect of significantly reducing complexity of the UE due to blind detection.

PCID List for CRS-Based DRS Measurement

The DRS-Info IE may additionally include a separate neighbor cell list, i.e., PCIDs.

When a PCID list is received through the DRS-Info IE, the UE may perform blind detection on a PSS/SSS and CRS only regarding the received PCID list in a corresponding frequency.

Similarly, the UE may significantly reduce complexity of the UE regarding blind detection through the aforementioned method.

Also, the DRS-Info IE may include a global cell ID (cellGlobalId) interworking with each PCID by PCIDs, together.

In this case, when transmitting a measurement report to the BS, the UE may transmit the cellGlobalId information together.

Or, the PCID list received by the UE may also be utilized as information indicating cells allowing the UE to preferentially perform blind detection.

In this case, the UE determines that cells corresponding to the received PCID list has high priority in blind detection.

Thus, the UE first (or essentially) performs blind detection and measurement on cells corresponding to the received PCIDD list.

Here, the terminal may be defined to preferentially perform blind detection on the cells corresponding to the received PCID list and subsequently perform blind detection on the other cells, rather than not performing blind detection on the cells other than those in the received PCID list.

Also, the DRS-CSI-RS configuration information may be transmitted in an explicit indication form to the UE.

The DRS-CSI-RS configuration information may be included in a DRS-Info IE and transmitted to the UE, or may be transmitted in a new separate IE form other than the DRS-Info IE, to the UE.

Here, the DRS-CSI-RS configuration information may include information (elements) of (1) to (5) below.

(1) Sequence Scrambling ID (e.g.: 0~503)

Sequence scrambling ID may be interpreted as a virtual cell ID (VCID) of a DRS-CSI-RS.

(2) Physical Cell-ID (PCID)(e.g.: 0~503)

PCID, which corresponds to synchronization assistance information, may be related to a DRS-CSI-RS.

The synchronization assistance information may be, for example, quasi co-location (QCL) information.

Here, the global cell IDD (cellGlobalId) interworking with each PCID by PCIDs may also be transmitted together with the PCID to the UE.

In this case, when transmitting a measurement report to the BS, the UE transmits the cellGlobalId together with the PCID.

For example, the reason for transmitting the cellGlobalId together with the PCID is to clearly indentify a cell to which a TP transmitting a specific DRS-CSI-RS belongs in a shared-cell ID scenario, or the like.

(3) Period and Offset Information

The period and offset information may refer to information corresponding to a subframe index of the DRS-CSI-RS within a DMTC occasion.

For example, a subframe index value of the DRS-CSI-RS may be 0, 1, 2, 3, 4, and the like.

Also, the period and offset information may be information indicating a subframe offset between SSS and CSI-RS within the DMTC occasion.

Or, the period and offset information may refer to information indicating information regarding a transmission period of the DRS-CSI-RS and a subframe position (or offset) such as designating a specific subframe position within the DMTC duration.

(4) RE Configuration Information of DRS-CSI-RS

RE configuration information of the DRS-CSI-RS refers to information indicating a position of RE(s) to which the DRS-CSI-RS is mapped in a subframe in which the DRS-CSI-RS is transmitted.

For example, the RE configuration information of the DRS-CSI-RS may include information discussed above in Table 10 and Table 11 in the same manner. Details thereof will be referred to Table 10 and Table 11.

(5) ZP-CSI-RS Configuration Information for Rate Matching Related to DRS

The ZP-CSI-RS configuration information refers to assistance information for PDSCH rate matching of a UE.

Similarly, the ZP-CSI-RS configuration information in the same form as that of Rel-10 discussed above may also be transmitted in a separate form to the UE.

In the case of FDD, up to five ZP-CSI-RS configurations may be provided in a separate form to the UE.

In the case of TDD, up to four ZP-CSI-RS configurations may be provided in a separate form to the UE.

The UE should apply the provided ZP-CSI-RS configuration always as rate matching information in PDSCH RE mapping.

Information Related to Measurement Report of UE for Performing DRS-Based Positioning When transmitting an RSTD measurement report to the BS, the UE may transmit identification information of ReferenceCell/TP and NeighborCell/TP together with an RSTD value to the BS in order to specify which NeighborCell/TP the RSTD value reported by the UE is based on as mentioned above.

Here, the NeighborCell/TP may be a cell/TP detected by the UE through blind detection in a DMTC occasion duration.

In this case, the UE may detect a PCID (physCellId) but may not know cellGlobalId.

In a case in which the existing RSTD report method is re-utilized to its maximum level, the UE is preferably defined not to transmit cellGlobalId when reporting the RSTD.

However, when the UE receives information related to a specific ReferenceCell/TP, if the cellGlobalId is received together, the UE may transmit the obtained cellGlobalId together with identification information of the specific ReferenceCell/TP when reporting the RSTD regarding the specific NeighborCell/TP.

Also, in a case in which the cellGlobalId value interworking with the identification information of the NeighborCell/TP is provided together with the identification information of the NeighborCell/TP to the UE, the UE may transmit the cellGlobalId value together with the identification information of the NeighborCell/TP when reporting the RSTD.

Here, the DMTC (configuration) information, the DMTC occasion, the DRS-Info IE, the DRS-CSI-RS configuration information, and the like, provided to the UE for fine positioning estimation through measurement and measurement report of the newly defined DRS-based UE may be generally simply referred to as positioning DRS information (posDRS-Info).

In order to be distinguished from the positioning DRS information, RRC signaling information transmitted for small cell discovery may be generally referred to as small DRS information (sceDRS-Info).

As discussed above, the positioning DRS information may be provided to the UE through an RRC message separate from the small cell DRS information.

The positioning DRS information denotes DRS configuration information for the purpose of positioning-related measurement and measurement report, and the small cell DRS information denotes DRS configuration information for the purpose of small cell enhancement.

Thus, an operation of the UE is different according to the purpose of the positioning DRS information (posDRS-Info) and the small cell DRS information (sceDRS-Info).

Thus, the DRS information based on purposes thereof is preferably provided to the UE through separate RRC signaling.

In another embodiment, in the method proposed in this disclosure, since small cell DRS information (sceDRS-Info) related to (small) cells performing an ON or OFF operation for a (Rel-12) small cell discovery operation is re-used for the purpose of positioning, network overhead may be reduced.

Thus, a specific restriction may be provided between the positioning DRS information (posDRS-Info) and the small cell DRS information (sceDRS-Info) which can be independently configured.

In detail, in order for the positioning DRS information (posDRS-Info) to be defined as valid information, some of positioning DRS information (posDRS-Info) should also be included in the small cell DRS information (sceDRS-Info).

For example, among positioning DRS information (posDRS-Info) (regarding a specific frequency), DMTC (configuration) information should necessarily be the same as DMTC (configuration) information of the small cell DRS information (sceDRS-Info) in the same frequency.

That is, when the DMTCa of the small cell DRS information (sceDRS-Info) is not the same as the DMTC of the positioning DRS information (posDRS-Info), the UE may be defined to disregard the DMTC of the positioning DRS information or regards it as an error case and may not perform an operation.

Also, among the positioning DRS information (posDRS-Info) (regarding a specific frequency), the DRS occasion information should necessarily be the same as the DRS occasion information of the small cell DRS information (sceDRS-Info) in the same frequency.

That is, the UE may be defined to disregard a DRS occasion configuration of the positioning DRS information (posDRS-Info) which is not the same as the DRS occasion configuration of the small cell DRS information (sceDRS-Info) or regards it as an error case and may not perform an operation.

Also, among the positioning DRS information (posDRS-Info) (regarding a specific frequency), the DRS-CSI-RS configuration information should necessarily be the same as specific DRS-CSI-RS configuration information of the small cell DRS information (sceDRS-Info) (and/or NZP (Non Zero Power)-CSI-RS configuration information for feedback).

When specific DRS-CSI-RS configuration information which is not the same as the specific DRS-CSI-RS of the small cell DRS information (sceDRS-Info) is set as the positioning DRS information (posDRS-Info), the UE may disregard it or regard it as an error case.

Also, among the positioning DRS information (posDRS-Info) (regarding a specific frequency), the ZP-CSI-RS configuration information should necessarily be the same as specific ZP-CSI-RS configuration information of the small cell DRS information (sceDRS-Info) in the same frequency.

When specific ZP-CSI-RS configuration information which is not the same as the specific ZP-CSI-RS configuration information of the small DRS information (sceDRS- Info) is set as the positioning DRS information (posDRS-Info), the UE may disregard it or regard it as an error case.

Also, in another embodiment, when the aforementioned positioning DRS information (posDRS-Info) and the small cell DRS information (sceDRS-Info) are separately configured and provided to the UE (the aforementioned constraints may be present), the UE should satisfy specific constraints with the small cell DRS information (sceDRS-Info) at a corresponding point in order to effectively apply the positioning DRS information (posDRS-Info) all the time.

The UE may be defined to determine that the positioning DRS information (posDRS-Info) information is valid only when the specific constraints are satisfied.

For example, in a case in which a specific information element of the small cell DMRS information (sceDRS-Info) is re-configured through an RRC connection reconfiguration message but information elements of the positioning DRS information (posDRS-Info) are not reconfigured in the same form as that of the specific information element of the small DRS information (sceDRS-Info), the UE may be defined to determine that the positioning DRS information (posDRS-Info) is not valid any longer.

That is, since the positioning DRS information and the small cell DRS information are configured through separate RRC signaling, preferably, corresponding pieces of information may be reconfigured to satisfy the constraints.

However, regarding the performing of reconfiguration, an ambiguity duration to which the reconfigured information is applied may be generated.

In this case, the positioning DRS information (posDRS-Info) may be defined to be valid from a point at which reconfiguration of the small cell DRS information (sceDRS-Info) is completed and reconfiguration of the positioning DRS information (posDRS-Info) is also completed all the time.

Or, unlike the above descriptions (in a case in which specific constraints are not provided), some of information elements configured as the small cell DRS information (sceDRS-Info) may be utilized as the positioning DRS information, without separately configuring the DRS.

That is, it may be defined to perform DRS-based positioning through simple signaling by defining an association between a relation between the information elements configured by the small cell DRS information and the information elements configured by the positioning DRS information.

In this case, information regarding the defined relation may be provided in advance.

For example, an identification indicator (e.g., an ID) is given to pieces of information (e.g., DMTC, DRS occasion, DRS-CSI-RS, ZP-CSI-RS and/or CSI-RS for feedback) RRC-signaled by the small cell DRS information (sceDRS-Info).

Also, the given identification indicator is included in the positioning DRS information and provided to the UE.

Thus, the UE interprets that the information corresponding to the identification indicator included in the positioning DRS information is the same as the small cell DRS information, thereby performing positioning-related measurement and report operation.

The pieces of information defined or configured to perform DRS-based positioning-related measurement and measurement report discussed above are not limited to be utilized only for the OTDOA-based RSTD measurement/report method.

That is, on the basis of the pieces of information discussed above, the UE may perform measurement report to the BS in a form of reporting an average power level regarding the measured RS.

Through the average power level report method, the network may perform positioning by recognizing whether the corresponding UE is located to be closest to a certain (DRS transmission) cell/TP (e.g., E-CID method).

Or, in a state in which RF patterns according to representative UE positions are formed as a database in advance, the network may perform positioning of the UE according to an RF pattern matching (RFPM) method through various UE measurement reports illustrated above.

FIG. 18 is a flow chart illustrating an example of a method for performing DRS-based positioning proposed in this disclosure.

First, the UE receives first assistance data including first reference cell information and first neighbor cell information from a first BS through a first frequency (F1: 2 GHz) (S1810).

Also, the UE receives second assistance data including second reference cell information and second neighbor cell information from a second BS through a second frequency (F2: 3.5 GHz) (S1810).

Here, the second frequency is higher than the first frequency.

The first BS may also be referred to as a macro BS, a master BS, a macro cell, and the like, and the second BS may be referred to as a small BS, a secondary BS, or a small cell, Also, the first assistance data includes PRS information (prsInfo) related to a cell transmitting a PRS as discussed above.

The PRS information may include at least one of a physical cell ID (PCID) of a cell transmitting the PRS, a scrambling ID, a PRS transmission period, and a PRS transmission resource.

Also, the second assistance data includes positioning DRS information (posDRS-Info) related to a DRS for positioning.

The positioning DRS information may include at least one of a DMTC (DRS Measurement Timing Configuration) information, a DMTC occasion information, DRS information (drsInfo), identification information of the second reference cell, and identification information of the at least one second neighbor cell.

Here, the DRS information may include at least one of a physical cell ID (PCID) of the at least one second neighbor cell, a cell global ID (cellGlobalId) associated with the PCID, DRS-CSI-RS configuration information, and ZP-CSI-RS configuration information.

Thereafter, the UE receives a positioning reference signal (PRS) on the basis of the first assistance data, and receives a discovery reference signal (DRS) on the basis of the second assistance data (S1820).

In detail, the UE receives PRSs from each of a first reference cell and at least one first neighbor cell on the basis of the first assistance data, and receives DRSs from each of a second reference cell and at least one second neighbor cell on the basis of the second assistance data.

Here, the DRS may be classified as a DRS for the purpose of positioning and a DRS for the purpose discovery, i.e., a DRS for the purpose of small cell enhancement Thus, the UE may receive indication information indicating that the DRS is used for positioning through radio resource control (RRC) signaling.

It is assumed that the DRS received by the UE in step S1820 is used for positioning.

Also, the UE performs blind detection on the DRS in a DMTC duration or a DMTC occasion duration on the basis of the positioning DRS information.

A transmission period of the DRS is shorter than a transmission period of the PRS.

Here, cells detected through the blind detection may be at least one second neighbor cell.

Thereafter, the UE performs measurement using the received PRS and the DRS (S1830).

In detail, the UE measures a first reference signal time difference (RSTD) regarding the first reference cell of the at least one first neighbor cell using the received PRS, and measures a second RSTDD regarding the second reference cell of the at least one second neighbor cell using the received DRS.

In another method of performing measurement, the UE may measure an average power level regarding the received PRS and the DRS.

Thereafter, the UE reports the results measured in step S1830 to the serving BS (S1840).

Device to which Present Disclosure is Applicable

FIG. 19 is a block diagram of a wireless communication device according to an embodiment of the present disclosure.

Referring to FIG. 19, a wireless communication system includes a BS 1910 and a plurality of UEs 1920 positioned within an area of the BS 1910.

The BS 1910 includes a processor 1911, a memory 1912, and a radio frequency (RF) unit 1913. The processor 1911 implements the function, process, and/or method proposed in FIGS. 1 to 18. Layers of a radio interface protocol may be implemented by the processor 1911.

The memory 1912 is connected to the processor 1911 and stores various types of information for driving the processor 1911. The RF unit 1913 is connected to the processor 1911 and transmits and/or receives a radio signal.

The UE 1920 includes a processor 1921, a memory 1922, and an RF unit 1923. The processor 1921 implements the function, process, and/or method proposed in FIGS. 1 to 18. Layers of a radio interface protocol may be implemented by the processor 1921. The memory 1922 is connected to the processor 1921 and stores various types of information for driving the processor 1921.

The RF unit 1923 is connected to the processor 1921 and transmits and/or receives a radio signal.

The memories 1912 and 1922 may be present within or outside the processors 1911 and 1921 and connected to the processors 1911 and 1921 through various well known units, respectively.

Also, the BS 1910 and/or the UE 1920 may have a single antenna or multiple antennas.

The above-described embodiments are results in which the elements and characteristics of the present invention are combined in a specific form. Each of the element or characteristics has to be considered as being optional unless otherwise explicitly described. Each of the elements or characteristics may be implemented in such a way as not to be combined with other elements or characteristics. Furthermore, some of the elements and/or the characteristics may be combined to form an embodiment of the present invention. Order of the operations described in the embodiments of the present invention may be changed. Some of the elements or characteristics of one embodiment may be included in the other embodiment or may be replaced with elements or characteristics corresponding to the other embodiment. It is evident that in the claims, embodiments may be constructed by combining claims not having an explicit citation relation or the claims not having an explicit citation relation may be included in a new claim according to amendments after an application.

The embodiments of the present invention may be implemented by various means, for example, hardware, firmware, software, or any combinations thereof. For hardware implementation, methods according to embodiments of the present disclosure described herein may be implemented by one or more of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and the like.

For firmware or software implementation, the methods according to embodiments of the present disclosure may be implemented in the form of a module, a procedure, a function, or the like, performing the foregoing functions or operations. Software codes may be stored in a memory unit and driven by a processor. The memory unit may be positioned within or outside of the processor and exchange data with the processor through various known means.

The present invention may be materialized in a specific form without departing from the spirit and essential characteristics of the present invention. Accordingly, the detailed description should not be interpreted as being limited from all aspects, but should be considered as being illustrative. The scope of the present invention should be determined by reasonable analysis of the attached claims, and all changes within an equivalent range of the present invention fall within the scope of the present invention. Furthermore, in the claims, embodiments may be constructed by combining claims not having an explicit citation relation or the claims not having an explicit citation relation may be included in a new claim according to amendments after an application.

INDUSTRIAL APPLICABILITY

In the wireless communication system of this disclosure, an example of the positioning performing method applied to a 3GPP LTE/LTE-A system is described, but the positioning performing method may also be applied to various wireless communication systems other than the 3GPP LTE/LTE-A system.

The invention claimed is:

1. A method for performing, by a user equipment (UE), positioning in a wireless communication system, the method comprising:
   receiving, from a first base station (BS), first assistance data including first reference cell information and first neighbor cell information through a first frequency;
   receiving, from a second BS, second assistance data including second reference cell information and second neighbor cell information through a second frequency;
   receiving, from the first BS, a positioning reference signal (PRS) based on the first assistance data;
   receiving, from the second BS, a discovery reference signal (DRS) based on the second assistance data;
   performing a coarse positioning measurement using the received PRS;
   performing a fine positioning measurement using the received DRS; and
   reporting results of the measurements to a serving BS,
   wherein the second assistance data further includes indication information indicating whether the DRS is used for positioning or for discovering.

2. The method of claim 1, wherein the receiving the PRS comprises receiving a PRS from each of a first reference cell and at least one first neighbor cell based on the first assistance data, and wherein the receiving the DRS comprises receiving a DRS from each of a second reference cell and at least one second neighbor cell based on the second assistance data.

3. The method of claim 2, wherein the performing the measurements comprises:

measuring a first reference signal time difference (RSTD) regarding the first reference cell of the at least one first neighbor cell using the received PRS; and measuring a second RSTD regarding the second reference cell of the at least one second neighbor cell using the received DRS.

4. The method of claim 1, wherein, in the performing the measurements, an average power level regarding the received PRS and the received DRS is measured.

5. The method of claim 1, wherein the first assistance data further includes PRS information related to a cell transmitting a PRS, and wherein the PRS information includes at least one of a physical cell identity (ID) (PCID) of a cell transmitting the PRS, a scrambling ID, a PRS transmission period, or a PRS transmission resource.

6. The method of claim 1, wherein the second assistance data further includes positioning DRS information related to a DRS for positioning, and wherein the positioning DRS information includes at least one of DRS measurement timing configuration (DMTC) information, DMTC occasion information, DRS information, identification information of a second reference cell, or identification information of at least one second neighbor cell.

7. The method of claim 6, wherein the DRS information includes at least one of a physical cell identity (ID) (PCID) of the at least one second neighbor cell, a cell global ID associated with the PCID, DRS channel state information-reference signal (CSI-RS) configuration information, or zero power (ZP)-CSI-RS configuration information.

8. The method of claim 7, wherein, in the receiving the DRS, the DRS is blind-detected in a DMTC duration or a DMTC occasion duration based on the positioning DRS information.

9. The method of claim 1, wherein the first BS is a macro BS or a macro cell, and the second BS is a small BS or a small cell.

10. The method of claim 1, wherein the second frequency is higher than the first frequency.

11. The method of claim 10, wherein a transmission period of the DRS is shorter than a transmission period of the PRS.

12. A user equipment (UE) for performing positioning in a wireless communication system, the UE comprising:

a transceiver configured to transmit and receive a wireless signal; and a processor functionally connected to the transceiver, wherein the processor is configured to:

control the transceiver to receive, from a first base station (BS), first assistance data including first reference cell information and first neighbor cell information through a first frequency, control the transceiver to receive, from a second BS, second assistance data including second reference cell information and second neighbor cell information through a second frequency, control the transceiver to receive, from the first BS, a positioning reference signal (PRS) based on the first assistance data, control the transceiver to receive, from the second BS, a discovery reference signal (DRS) based on the second assistance data, perform a coarse positioning measurement using the received PRS, perform a fine positioning measurement using the received DRS, and report results of the measurements to a serving BS, wherein the second assistance data further includes indication information indicating whether the DRS is used for positioning or for discovering.

* * * * *